(12) United States Patent
Rains, Jr. et al.

(10) Patent No.: US 7,939,794 B2
(45) Date of Patent: May 10, 2011

(54) INTELLIGENT SOLID STATE LIGHTING

(75) Inventors: Jack C. Rains, Jr., Herndon, VA (US); Don F. May, Vienna, VA (US); David P. Ramer, Reston, VA (US)

(73) Assignee: ABL IP Holding LLC, Conyers, GA (US)

( * ) Notice: Subject to any disclaimer, the term of this patent is extended or adjusted under 35 U.S.C. 154(b) by 0 days.

(21) Appl. No.: 12/775,098

(22) Filed: May 6, 2010

(65) Prior Publication Data

US 2010/0213854 A1 Aug. 26, 2010

Related U.S. Application Data

(60) Division of application No. 12/420,340, filed on Apr. 8, 2009, which is a division of application No. 11/593,015, filed on Nov. 6, 2006, now Pat. No. 7,521,667, which is a continuation-in-part of application No. 11/294,564, filed on Dec. 6, 2005, now Pat. No. 7,148,470, which is a continuation of application No. 10/832,464, filed on Apr. 27, 2004, now Pat. No. 6,995,355, which is a continuation-in-part of application No. 10/601,101, filed on Jun. 23, 2003, now Pat. No. 7,145,125.

(51) Int. Cl.
*F21V 9/00* (2006.01)

(52) U.S. Cl. .................... 250/228; 362/235; 362/317

(58) Field of Classification Search .................. 250/205, 250/228; 356/236, 257; 362/234, 235, 3, 362/16, 6, 256, 317

See application file for complete search history.

(56) References Cited

U.S. PATENT DOCUMENTS

| | | | |
|---|---|---|---|
| 4,677,533 | A | 6/1987 | McDermott et al. |
| 4,962,687 | A | 10/1990 | Belliveau et al. |
| 4,992,704 | A | 2/1991 | Stinson |
| 5,241,459 | A | 8/1993 | Kaplan |
| 5,365,084 | A | 11/1994 | Cochran et al. |

(Continued)

FOREIGN PATENT DOCUMENTS

EP    1 176 849 A2    1/2002

(Continued)

OTHER PUBLICATIONS

United States Office Action issued in U.S. Appl. No. 12/420,340, mailed Jun. 24, 2010.

(Continued)

*Primary Examiner* — Tony Ko
(74) *Attorney, Agent, or Firm* — McDermott Will & Emery LLP

(57) ABSTRACT

A light fixture, using one or more solid state light emitting elements utilizes a diffusely reflect chamber to provide a virtual source of uniform output light, at an aperture or at a downstream optical processing element of the system. Systems disclosed herein also include a detector, which detects electromagnetic energy from the area intended to be illuminated by the system, of a wavelength absent from a spectrum of the combined light system output. A system controller is responsive to the signal from the detector. The controller typically may control one or more aspects of operation of the solid state light emitter(s), such as system ON-OFF state or system output intensity or color. Examples are also discussed that use the detection signal for other purposes, e.g. to capture data that may be carried on electromagnetic energy of the wavelength sensed by the detector.

12 Claims, 12 Drawing Sheets

U.S. PATENT DOCUMENTS

| | | | |
|---|---|---|---|
| 5,400,228 A | 3/1995 | Kao |
| 5,420,482 A | 5/1995 | Phares |
| 5,471,052 A | 11/1995 | Ryczek |
| 5,608,213 A | 3/1997 | Pinkus et al. |
| 5,650,843 A | 7/1997 | Moberg et al. |
| 5,752,766 A | 5/1998 | Bailey et al. |
| 5,838,247 A | 11/1998 | Bladowski |
| 5,877,490 A | 3/1999 | Ramer et al. |
| 5,899,557 A | 5/1999 | McDermott |
| 5,914,487 A | 6/1999 | Ramer et al. |
| 6,007,209 A | 12/1999 | Pelka |
| 6,007,225 A | 12/1999 | Ramer et al. |
| 6,037,721 A | 3/2000 | Lansing et al. |
| 6,084,250 A | 7/2000 | Justel et al. |
| 6,127,783 A | 10/2000 | Pashley et al. |
| 6,139,166 A | 10/2000 | Marshall et al. |
| 6,149,283 A | 11/2000 | Conway et al. |
| 6,150,774 A | 11/2000 | Mueller et al. |
| 6,166,496 A | 12/2000 | Lys et al. |
| 6,183,086 B1 | 2/2001 | Neubert |
| 6,184,628 B1 | 2/2001 | Ruthenberg |
| 6,200,002 B1 | 3/2001 | Marshall et al. |
| 6,219,140 B1 | 4/2001 | Kaplan |
| 6,222,172 B1 | 4/2001 | Fossum et al. |
| 6,222,623 B1 | 4/2001 | Wetherell |
| 6,238,077 B1 | 5/2001 | Ramer et al. |
| 6,257,737 B1 | 7/2001 | Marshall et al. |
| 6,266,136 B1 | 7/2001 | Ramer et al. |
| 6,273,589 B1 | 8/2001 | Weber et al. |
| 6,280,054 B1 | 8/2001 | Cassarly et al. |
| 6,286,979 B1 | 9/2001 | Ramer et al. |
| 6,299,328 B1 | 10/2001 | Wilson |
| 6,299,329 B1 | 10/2001 | Mui et al. |
| 6,334,700 B2 | 1/2002 | Ramer et al. |
| 6,340,868 B1 | 1/2002 | Lys et al. |
| 6,342,695 B1 | 1/2002 | Ramer et al. |
| 6,357,889 B1 | 3/2002 | Duggal et al. |
| 6,357,893 B1 | 3/2002 | Belliveau |
| 6,422,718 B1 | 7/2002 | Anderson et al. |
| 6,441,558 B1 | 8/2002 | Muthu et al. |
| 6,459,919 B1 | 10/2002 | Lys et al. |
| 6,488,389 B2 | 12/2002 | Cassarly et al. |
| 6,523,977 B2 | 2/2003 | Chuang et al. |
| 6,525,668 B1 | 2/2003 | Petrick |
| 6,527,411 B1 | 3/2003 | Sayers |
| 6,533,429 B2 | 3/2003 | Yoneda |
| 6,547,416 B2 | 4/2003 | Pashley et al. |
| 6,548,967 B1 | 4/2003 | Dowling et al. |
| 6,621,239 B1 | 9/2003 | Belliveau |
| 6,626,558 B2 | 9/2003 | Momot et al. |
| 6,630,801 B2 | 10/2003 | Schuurmans |
| 6,636,003 B2 | 10/2003 | Rahm et al. |
| 6,659,622 B2 | 12/2003 | Katogi et al. |
| 6,692,136 B2 | 2/2004 | Marshall et al. |
| 6,700,112 B2 | 3/2004 | Brown |
| 6,744,223 B2 | 6/2004 | Laflamme et al. |
| 6,759,814 B2 | 7/2004 | Vogel et al. |
| 6,793,374 B2 | 9/2004 | Begemann |
| 6,806,659 B1 | 10/2004 | Mueller et al. |
| 6,836,083 B2 | 12/2004 | Mukai |
| 6,840,652 B1 | 1/2005 | Hymer |
| 6,841,945 B1 | 1/2005 | Elwell |
| 6,850,159 B1 | 2/2005 | Mudge |
| 6,888,322 B2 | 5/2005 | Dowling et al. |
| 6,897,624 B2 | 5/2005 | Lys et al. |
| 6,936,978 B2 | 8/2005 | Morgan et al. |
| 6,965,205 B2 | 11/2005 | Piepgras et al. |
| 6,967,448 B2 | 11/2005 | Morgan et al. |
| 6,969,954 B2 | 11/2005 | Lys |
| 6,975,079 B2 | 12/2005 | Lys et al. |
| 6,995,355 B2 | 2/2006 | Rains, Jr. et al. |
| 7,012,382 B2 | 3/2006 | Cheang et al. |
| 7,014,336 B1 | 3/2006 | Ducharme et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,042,172 B2 | 5/2006 | Dowling et al. |
| 7,064,498 B2 | 6/2006 | Dowling et al. |
| 7,108,413 B2 | 9/2006 | Kwong et al. |
| 7,121,690 B1 | 10/2006 | Ramer et al. |
| 7,144,131 B2 | 12/2006 | Rains |
| 7,145,125 B2 | 12/2006 | May et al. |
| 7,148,470 B2 | 12/2006 | Rains, Jr. et al. |
| 7,157,694 B2 | 1/2007 | May et al. |
| 7,374,311 B2 * | 5/2008 | Rains et al. .................. 362/234 |
| 7,479,622 B2 | 1/2009 | May et al. |
| 7,497,590 B2 | 3/2009 | Rains, Jr. et al. |
| 7,521,667 B2 | 4/2009 | Rains, Jr. et al. |
| 7,604,375 B2 | 10/2009 | Rains, Jr. et al. |
| 7,625,098 B2 | 12/2009 | Rains, Jr. et al. |
| 2002/0064043 A1 | 5/2002 | Ariga et al. |
| 2002/0145708 A1 | 10/2002 | Childers et al. |
| 2003/0034985 A1 | 2/2003 | Needham Riddle et al. |
| 2003/0076056 A1 | 4/2003 | Schuurmans |
| 2003/0117796 A1 * | 6/2003 | Voser .......................... 362/231 |
| 2003/0193816 A1 | 10/2003 | Rahn |
| 2004/0105264 A1 | 6/2004 | Spero |
| 2004/0151008 A1 | 8/2004 | Artsyukhoovich et al. |
| 2004/0156199 A1 | 8/2004 | Rivas et al. |
| 2004/0160199 A1 | 8/2004 | Morgan et al. |
| 2004/0188594 A1 | 9/2004 | Brown et al. |
| 2005/0040774 A1 | 2/2005 | Mueller et al. |
| 2005/0062446 A1 | 3/2005 | Ashdown |
| 2005/0063063 A1 | 3/2005 | Ashdown |
| 2005/0156103 A1 | 7/2005 | May et al. |
| 2005/0161586 A1 | 7/2005 | Rains et al. |
| 2006/0001381 A1 | 1/2006 | Robinson et al. |
| 2006/0028156 A1 | 2/2006 | Jungwirth |
| 2008/0291670 A1 | 11/2008 | Rains |
| 2008/0315774 A1 | 12/2008 | May et al. |
| 2009/0109669 A1 | 4/2009 | Rains, Jr. et al. |
| 2009/0251884 A1 | 10/2009 | Rains |
| 2010/0008087 A1 | 1/2010 | Rains, Jr. et al. |

FOREIGN PATENT DOCUMENTS

| | | |
|---|---|---|
| JP | 08-180978 | 7/1996 |
| WO | WO 00/19141 | 4/2000 |
| WO | WO 02/076150 A1 | 9/2002 |
| WO | WO 03/069219 A1 | 8/2003 |

OTHER PUBLICATIONS

"Developmental Product Technical Data Bulletin" FERRO Corporation- Specialty Plastics Group, Filled and Reinforced Plastics Division, Evansville, IN.

"Industrial Equipment News . . . The Leading Publisher of New Products Worldwide" IEN, Apr. 2003—www.inquiryexpress.com.

Steigerwald, Daniel A., et al. "Illumination With Solid State Lighting Technology." IEEE Journal on Selected Topics in Quantum Electronics, vol. 8, No. 2, Mar./Apr. 2002, pp. 310-320.

Xiang, Hector. "efg's Chromaticity Diagrams Lab Report." URL: http://www.efg2.com/Lab/Graphics/Colors/Chromaticity.htm pp. 1-15.

Tawil, Joe., et al. "Colorimetry." URL: http://www.cameraguild.com/technology/colrimetry.htm pp. 1-13.

"Holographic Diffusers", EO Edmund Industrial Optics, available at http://www.edmundoptics.com/onlinecatalog/DisplayProduct.cfm?productid-1363.

"Source Four Revolution", 2003.

"LSI Unveils the LumeLEX at ARC06," Lighting Services Inc., Press Release, Feb. 13, 2006.

"TIR Systems' Partner Lighting Services Inc. Unveils First Product Based on Lexel™ Technology at ARC06 in London," TIR, Feb. 13, 2006.

Brent York, "Bridging the Gap for LEDs in the Architectural and Lighting Markets," Blue 2005, May 16-19, 2005, TIR Systems, Ltd.

Grant Harlow, "Workshop 4: LED Technology, Bridging the Gap: From LEDs to Lighting," LightFair International, Apr. 11, 2005, TIR Systems Ltd.

U.S. Office Action issued in U.S. Appl. No. 11/233,036, dated May 30, 2007.

European Exam Report issued in European Patent Application No. 05 756 155.7, mailed May 13, 2009.

Canadian Office Action issued in Canadian Patent Application No. 2,558,958, mailed Jun. 17, 2009.
European Examination Report issued in European Patent Application No. 05 758 377.5, dated May 13, 2009.
United States Office Action issued in U.S. Appl. No. 12/342,359, mailed Jan. 11, 2010.
European Search Report issued in European Patent Application No. 05756155.7-1268/1740350 dated Jul. 2, 2008.
Supplementary European Search Report issued in European Patent Application No. 05740253.9-1268/1740882 dated Jul. 4, 2008.
Supplementary European Search Report issued in European Patent Application No. 05758377.5-1268/1740883 dated Jul. 2, 2008.
Inventors Aug. 7, 2008 Declaration for Compliance with Duty of Disclosure under 37 CFR §§ 1.56 with exhibits.
Entire USPTO Prosecution History of Jack C. Rains, Jr., et al., U.S. Appl. No. 12/342,359, filed Dec. 23, 2008, Precise Repeatable Setting of Color Characteristics for Lighting Applications.
Entire USPTO Prosecution History of Donald F. May, U.S. Appl. No. 12/203,428, filed Sep. 3, 2008, Optical Integrating Cavity Lighting System Using Multiple LED Light Sources.
Entire USPTO Prosecution History of Jack C. Rains, Jr., U.S. Appl. No. 12/485,320, filed Jun. 16, 2009, Lighting Fixture Using Semiconductor Coupled With a Reflector Having Reflective Surface With a Phosphor Material.
Entire USPTO History of Jack C. Rains, Jr., U.S. Appl. No. 11/589,941, filed Oct. 31, 2006, Lighting System Using Semiconductor Coupled With a Reflector Having a Reflective Surface With a Phosphor Material.
Entire USPTO Prosecution History of Jack C. Rains, Jr., et al., U.S. Appl. No. 12/563,632, filed Sep. 21, 2009, Optical Integrating Chamber Lighting Using One or More Additional Color Sources to Adjust White Light.
United States Office Action issued in U.S. Appl. No. 12/563,632, mailed Dec. 16, 2010.
United States Office Action issued in U.S. Appl. No. 12/785,855, mailed Nov. 29, 2010.

* cited by examiner

INTELLIGENT SOLID STATE LIGHTING

CROSS-REFERENCE TO RELATED APPLICATIONS

This application is a Divisional of U.S. application Ser. No. 12/420,340, filed on Apr. 8, 2009, which is a divisional of U.S. patent application Ser. No. 11/593,015, filed on Nov. 6, 2006 now U.S. Pat. No. 7,521,667, which is a continuation-in-part of U.S. patent application Ser. No. 11/294,564 filed on Dec. 6, 2005 now U.S. Pat. No. 7,148,470, which is a continuation of U.S. patent application Ser. No. 10/832,464, filed Apr. 27, 2004 now U.S. Pat. No. 6,995,355, which is a continuation-in-part of U.S. patent application Ser. No. 10/601,101, filed Jun. 23, 2003 now U.S. Pat. No. 7,145,125, the disclosures of which are entirely incorporated herein by reference; and this application claims the benefits of the filing dates of those earlier applications.

TECHNICAL FIELD

The present subject matter relates to techniques and equipment to provide visible lighting, particularly highly uniform visible light emissions and/or light emissions of a desired visible spectral characteristic, using solid state light emitting elements, in combination with sensing of energy of a wavelength that is absent from the light emitted for purposes of the visible illumination so as to facilitate intelligent applications such as occupancy detection, remote control, data communications or the like.

BACKGROUND

An increasing variety of lighting applications require a precisely controlled spectral characteristic of the radiant electromagnetic energy. It has long been known that combining the light of one color with the light of another color creates a third color. For example, the commonly used primary colors Red, Green and Blue of different amounts can be combined to produce almost any color in the visible spectrum. Adjustment of the amount of each primary color enables adjustment of the spectral properties of the combined light stream. Recent developments for selectable color systems have utilized solid state devices, such as light emitting diodes, as the sources of the different light colors.

Light emitting diodes (LEDs) were originally developed to provide visible indicators and information displays. For such luminance applications, the LEDs emitted relatively low power. However, in recent years, improved LEDs have become available that produce relatively high intensities of output light. These higher power LEDs, for example, have been used in arrays for traffic lights. Today, LEDs are available in almost any color in the color spectrum.

Systems are known which combine controlled amounts of projected light from at least two LEDs of different primary colors. Attention is directed, for example, to U.S. Pat. Nos. 6,459,919, 6,166,496 and 6,150,774. Typically, such systems have relied on using pulse-width modulation or other modulation of the LED driver signals to adjust the intensity of each LED color output. Such prior systems have relied on direct radiation or illumination from the individual source LEDs.

In some applications, the LEDs may represent undesirably bright sources if viewed directly. Solid state light emitting elements have small emission output areas and typically they appear as small point sources of light. As the output power of solid state light emitting elements increases, the intensity provided over such a small output area represents a potentially hazardous light source. Increasingly, direct observation of such sources, particularly for any substantial period of time, may cause eye injury.

Also, the direct illumination from LEDs providing multiple colors of light has not provided optimum combination throughout the field of illumination. Pixelation often is a problem with prior solid state lighting devices. In some systems, the observer can see the separate red, green and blue lights from the LEDs at short distances from the fixture, even if the LEDs are covered by a translucent diffuser. The light output from individual LEDs or the like appear as identifiable/individual point sources or 'pixels.' Integration of colors by the eye becomes effective only at longer distances, otherwise the fixture output exhibits striations of different colors.

Another problem arises from long-term use of LED type light sources. As the LEDs age, the output intensity for a given input level of the LED drive current decreases. As a result, it may be necessary to increase power to an LED to maintain a desired output level. This increases power consumption. In some cases, the circuitry may not be able to provide enough light to maintain the desired light output level. As performance of the LEDs of different colors declines differently with age (e.g. due to differences in usage), it may be difficult to maintain desired relative output levels and therefore difficult to maintain the desired spectral characteristics of the combined output. The output levels of LEDs also vary with actual temperature (thermal) that may be caused by difference in ambient conditions or different operational heating and/or cooling of different LEDs. Temperature induced changes in performance cause changes in the spectrum of light output.

U.S. Pat. No. 5,803,592 suggests a light source design intended to produce a high uniformity substantially Lambertian output. The disclosed light design used a diffusely reflective hemispherical first reflector and a diffuser. The light did not use a solid state type light emitting element. The light source was an arc lamp, metal halide lamp or filament lamp. The light included a second reflector in close proximity to the lamp (well within the volume enclosed by the hemispherical first reflector and the diffuser) to block direct illumination of and through the diffuser by the light emitting element, that is to say, so as to reduce the apparent surface brightness of the center of the light output that would otherwise result from direct output from the source.

U.S. Pat. No. 6,007,225 to Ramer et al. (Assigned to Advanced Optical Technologies, L.L.C.) discloses a directed lighting system utilizing a conical light deflector. At least a portion of the interior surface of the conical deflector has a specular reflectivity. In several disclosed embodiments, the source is coupled to an optical integrating cavity; and an outlet aperture is coupled to the narrow end of the conical light deflector. This patented lighting system provides relatively uniform light intensity and efficient distribution of light over a field of illumination defined by the angle and distal edge of the deflector. However, this patent does not discuss particular color combinations or effects or address specific issues related to lighting using one or more solid state light emitting elements.

Hence, a need still exists for a technique to efficiently process electromagnetic energy from one or more solid state light emitting sources and direct uniform electromagnetic energy effectively toward a desired field of illumination, in a manner that addresses as many of the above discussed issues as practical.

Also, there are a variety of consumer needs and applications that require additional intelligence in association with lighting equipment. It is often desirable to provide enhanced control features for the light and/or for associated equipment, either in the form of wireless remote control or in response to occupancy detection.

A variety of technologies are known, for example based on ultrasonic sensing and passive or active sensing, to determine occupancy of an area to be illuminated and control one or more light fixtures in response to the occupancy determination. Typically, the occupancy sensor is mounted in a wall or ceiling of the area that the lighting device is intended to illuminate. Such control based on sensing of occupancy reduces energy and maintenance costs by turning-off the light(s) when not needed. Typically, existing occupancy sensors have been used with conventional lighting devices, such as fluorescent and incandescent lamps. General strategies of occupancy responsive control may be applicable to LED based lighting, but systems and methodologies have not yet been developed that specifically integrate such control strategies into LED based lighting in a highly effective and efficient manner.

Hence, it would also be desirable that solid state lighting solutions also support enhanced sensing and processing capabilities for communication purposes, automation and control of the lighting equipment and/or other systems, monitoring, or the like.

SUMMARY

A lighting system as disclosed herein includes a chamber having a reflective interior surface. At least a portion of the interior surface has a diffuse reflectivity, such that the chamber combines light by diffuse reflection within the chamber. Typically, examples implement the chamber as an optical integrating cavity. The chamber has an optical aperture through which combined light emerges in a direction for lighting an area intended to be illuminated by the system. One or more solid state light emitting elements supply light to the chamber. Each solid state light emitting element is coupled so as to supply light to the chamber in such a manner that substantially all light emitted from each solid state light emitting element reflects diffusely at least once within the interior of the chamber before combined light emission through the optical aperture toward the area intended to be illuminated by the system. The systems disclosed herein also include a detector, which detects electromagnetic energy from the area intended to be illuminated by the system, of a wavelength absent from a spectrum of the combined light system output for illumination purposes.

A system controller will receive the signal from the detector. In several examples, the controller controls one or more aspects of operation of the solid state light emitter(s). The controller may perform such a function of light control in response to the detector signal, for example by turning the solid state light emitter(s) on or off or otherwise controlling the amount of light energy output by each of the solid state light emitter(s). The detector signal may represent a remote control command, or the controller may process the signal to detect occupancy status of the illuminated area. However, examples are also discussed that use the detection signal for other purposes, for example, to capture data that may be carried on electromagnetic energy of the particular wavelength sensed by the detector.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1A:
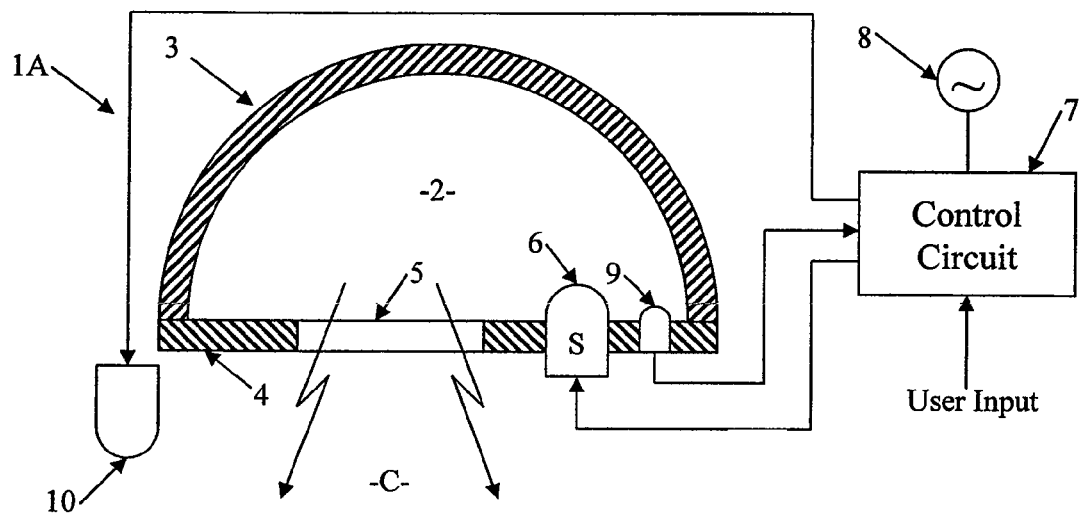
FIG. 1A illustrates an example of an intelligent light emitting system including a fixture using a solid state light emitting element, with certain elements of the fixture shown in cross-section.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present concepts. Reference now is made in detail to the examples illustrated in the accompanying drawings and discussed below.

A lighting system as disclosed herein includes a chamber having a reflective interior surface. At least a portion of the interior surface has a diffuse reflectivity, such that the chamber combines light by diffuse reflection within the chamber. Typical examples implement the chamber as an optical integrating cavity. The chamber has an optical aperture through which combined light emerges in a direction for lighting an area intended to be illuminated by the system. One or more solid state light emitting elements supply light to the chamber. Each solid state light emitting element is coupled so as to supply light to the chamber in such a manner that substantially all light emitted from each solid state light emitting element reflects diffusely at least once within the interior of the chamber before combined light emission through the optical aperture toward the area intended to be illuminated by the system. Additional optical processing elements may process the combined light from the aperture.

The optical processing by the chamber and other elements, in many of the examples disclosed herein, converts one or more solid state light sources of relatively small areas ("point sources") into a virtual source of a larger area. The light output forms a virtual source output in that the fixture or system output, e.g., at the optical aperture of the chamber or an output of a further optical processing element, forms the apparent source of light as perceived from the area that is being illuminated. Point source light generated by one or more solid state light emitters, is not individually perceived as the source(s) of light from the perspective of the illuminated area. Instead, the virtual source appears as the single source of uniform light output over a larger output area.

The systems disclosed herein also include a detector, for example as an integral element of a light fixture. The detector detects electromagnetic energy from the area intended to be illuminated by the system, of a wavelength not present in (absent from) a spectrum of the combined light system output, that is to say generated by the solid state light emitter(s) and the chamber for the system's intended illumination application. The system may be passive, in that the detector detects light from within the area without itself supplying electromagnetic energy of the particular wavelength into the area. Alternatively, the system may be active, in that the system generates electromagnetic energy of the particular wavelength and the detector detects reflections of that electromagnetic energy from the illuminated area. The detector and source may process to different wavelengths, e.g. for two-way communication. The detector may be coupled to the chamber or a second chamber, or the detector may be outside the chamber. The source may supply light through the chamber or it may be separate.

A system controller will receive the signal from the detector. The controller in some examples controls one or more aspects of operation of the solid state light emitter(s). The controller may control lighting in response to the detector signal, for example by turning the solid state light emitter(s) on or off or otherwise controlling the amount of light energy output by each of the solid state light emitter(s). However, examples are also discussed that use the detection signal for other purposes, for example, to capture data that may be carried on electromagnetic energy of the particular wavelength sensed by the detector.

With that overview, it may be helpful now to consider examples with specific reference to the drawings.

As shown in FIG. 1A, an exemplary lighting system 1A includes an optical integrating cavity 2 having a reflective interior surface. At least a portion of the interior surface of the cavity 2 exhibits a diffuse reflectivity. The cavity 2 may have various shapes. The illustrated cross-section would be substantially the same if the cavity is hemispherical or if the cavity is semi-cylindrical with a lateral cross-section taken perpendicular to the longitudinal axis. It is desirable that the cavity surface have a highly efficient reflective characteristic, e.g. a reflectivity equal to or greater than 90%, with respect to the relevant wavelengths. The entire interior surface may be diffusely reflective, or one or more substantial portions may be diffusely reflective while other portion(s) of the cavity surface may have different light responsive characteristics. In some examples, one or more other portions are substantially specular.

For purposes of the discussion, the cavity 2 in the system 1A is assumed to be hemispherical. In such an example, the optical cavity 2 comprises a hemispherical dome 3 and a substantially flat cover plate 4, with the reflective cavity formed between reflective surfaces of the dome 3 and plate 4. At least the interior facing surface(s) of the dome 3 and possibly interior facing surface of the cover plate 4 are highly diffusely reflective, so that the resulting cavity 2 is highly diffusely reflective with respect to the radiant energy spectrum produced by and/or detected by the system 1A. As a result, the cavity 2 is an integrating type optical cavity. Although shown as separate elements, the dome and plate may be formed as an integral unit. The cavity 2 has an optical aperture 5, which allows emission of reflected and diffused light C from within the interior of the cavity 2 into a region to facilitate a humanly perceptible lighting application for the system 1A.

The lighting system 1A also includes at least one source of radiant electromagnetic energy for illumination purposes. The fixture geometry discussed herein may be used with any appropriate type of sources of radiant electromagnetic energy. Although other types of sources of radiant electromagnetic energy may be used, such as various conventional forms of incandescent, arc, neon and fluorescent lamp, at least one source takes the form of a solid state light emitting element (S), represented by the single solid state lighting element (S) 6 in the drawing. In a single source example, the element (S) 6 typically emits visible light for illumination application. In multi-source examples discussed later, some source(s) may emit visible light and one or more other sources may emit light in another part of the electromagnetic spectrum. Each solid state light emitting element (S) 6 is coupled to supply light to enter the cavity 2 at a point not directly observable through the aperture 5 from the region illuminated by the fixture output C. Various couplings and various light entry locations may be used.

As discussed herein, applicable solid state light emitting elements (S) essentially include any of a wide range light emitting or generating devices formed from organic or inorganic semiconductor materials. Examples of solid state light emitting elements include semiconductor laser devices and the like. Many common examples of solid state lighting elements, however, are classified as types of "light emitting diodes" or "LEDs." This exemplary class of solid state light emitting devices encompasses any and all types of semiconductor diode devices that are capable of receiving an electrical signal and producing a responsive output of electromagnetic energy. Thus, the term "LED" should be understood to include light emitting diodes of all types, light emitting polymers, organic diodes, and the like. LEDs may be individually packaged, as in the illustrated examples. Of course, LED based devices may be used that include a plurality of LEDs within one package, for example, multi-die LEDs that contain separately controllable red (R), green (G) and blue (B) LEDs within one package. Those skilled in the art will recognize that "LED" terminology does not restrict the source to any particular type of package for the LED type source. Such terms encompass LED devices that may be packaged or non-packaged, chip on board LEDs, surface mount LEDs, and any other configuration of the semiconductor diode device that emits light. Solid state lighting elements may include one or more phosphors and/or nanophosphors based upon quantum dots, which are integrated into elements of the package or light processing elements of the fixture to convert at least some radiant energy to a different more desirable wavelength or range of wavelengths.

The color or spectral characteristic of light or other electromagnetic radiant energy relates to the frequency and wavelength of the energy and/or to combinations of frequencies/wavelengths contained within the energy. Many of the examples relate to colors of light within the visible portion of the spectrum, although examples also are discussed that utilize or emit other energy. Electromagnetic energy, typically in the form of light energy from the one or more solid state light sources (S) 6, is diffusely reflected and combined within the cavity 2 to form combined light C for emission via the aperture 5. Such integration, for example, may combine light from multiple sources. The integration tends to form a relatively Lambertian distribution across the aperture. When viewed from the area illuminated by the combined light C, the aperture appears to have substantially infinite depth of the integrated light C. Also, the visible intensity is spread uniformly across the aperture, as opposed to individual small point sources of higher intensity as would be seen if the one or more elements (S) 6 were directly visible without diffuse reflection before emission through the aperture 5. Hence, the light output C appears to emanate from a virtual source, at the aperture 5 in this example.

Pixelation is a problem with many prior solid state lighting devices. When the fixture output is observed, the light output from individual LEDs or the like appear as identifiable/individual point sources or 'pixels.' Even with diffusers or other forms of common mixing, the pixels of the sources are apparent. The observable output of such a prior system exhibits a high maximum-to-minimum intensity ratio. In systems using multiple light color sources, e.g. RGB LEDs, unless observed from a substantial distance from the fixture, the light from the fixture often exhibits striations of different colors.

Systems and light fixtures as disclosed herein, however, do not exhibit such pixilation. Instead, the cavity output C appears as unpixelated virtual source of relatively uniform intensity distribution across the apparent output area of the fixture, e.g. across the optical aperture 5 of the cavity 2. The optical integration sufficiently mixes the light from the solid state light emitting elements 6 that the combined light output C of the virtual source is at least substantially Lambertian in distribution across the optical output area of the fixture, that is to say across the aperture 5 of the cavity 2. As a result, the combined light output C exhibits a relatively low maximum-to-minimum intensity ratio across the aperture 5. In the examples shown herein, the combined light output exhibits a maximum to minimum ratio of 2 to 1 or less over substantially the entire optical output area. The examples rely on various implementations of the optical integrating cavity 2 as the mixing element to achieve this level of output uniformity, however, other mixing elements could be used if they are configured to produce such uniform output (Lambertian and/or relatively low maximum-to-minimum intensity ratio across the fixture's optical output area).

It also should be appreciated that solid state light emitting elements 6 may be configured to generate electromagnetic radiant energy having various bandwidths for a given spectrum (e.g. narrow bandwidth of a particular color, or broad bandwidth centered about a particular), and may use different configurations to achieve a given spectral characteristic. For example, one implementation of a white LED may utilize a number of dies that generate different primary colors which combine to form essentially white light. In another implementation, a white LED may utilize a semiconductor that generates light of a relatively narrow first spectrum in response to an electrical input signal, but the narrow first spectrum acts as a pump. The light from the semiconductor "pumps" a phosphor material contained in the LED package, which in turn radiates a different typically broader spectrum of light that appears relatively white to the human observer.

The system 1A also includes a controller, shown in the example as a control circuit 7, which is responsive to a user actuation for controlling an amount of radiant electromagnetic energy supplied to the cavity 2 by the solid state light emitting element or elements 6 of the system 1A. The control circuit 7 typically includes a power supply circuit coupled to a power source, shown as an AC power source 8. The control circuit 7 also includes one or more adjustable driver circuits for controlling the power applied to the solid state light emitting elements (S) 6 and thus the amount of radiant energy supplied to the cavity 2 by each source 6. The control circuit 7 may be responsive to a number of different control input signals, for example, to one or more user inputs as shown by the arrow in FIG. 1A and possibly signals from one or more feedback sensors, as discussed in more detail later.

The virtual source output light C has a spectral characteristic, typically in the visible light region of the spectrum. The system 1A also includes a detector 9. In this first example, the detector 9 senses a characteristic of electromagnetic energy reflected within the cavity 5. For purposes of the present discussion, the detector 9 is a device of a type for sensing at least one wavelength of light not present in the spectrum of light output C from the aperture 5 that forms the virtual source in this example. The wavelength may be a visible wavelength corresponding to a notch in the visible spectrum of output light C. In other examples where the output C is entirely in the visible light portion of the spectrum, the wavelength sensed by detector 9 is a wavelength outside the visible spectrum, for example in the near or far infrared (IR) range or in the ultraviolet (UV) range. Since the detector 9 senses a wavelength not present in the spectrum of light output C and thus absent from the light generated by the solid state source 6, the detector 9 is responsive to energy of that wavelength that enters the cavity 2 via the aperture 5 and reflects off the surface(s) of the cavity.

The detector 9 supplies a detection signal to the controller 7. The controller 7 may control one or more operations of the system 1A in response to the detection signal, for example to turn the light output C ON and OFF or to vary the intensity of the output (while ON). Alternatively, the controller 7 may process the signal for other purposes, e.g. to demodulate the signal to capture data that may be carried on the energy of the particular wavelength.

Examples are discussed below in which the detector 9 is outside and/or separate from the cavity 2. However, in the first exemplary system 1, the detector 9 is coupled to a location in the optical integrating cavity 2 at which at least a substantial portion of the electromagnetic energy of the particular wavelength that enters the cavity 2 through the optical aperture 5 is reflected one or more times off the reflective interior surface of the cavity 2 before reaching the location of coupling to the detector 9. The detector 9 may be at or otherwise coupled to any such point on a surface of the cavity 2, typically a point not directly visible or illuminated through the aperture 5. In the example, the detector 9 is mounted to receive light at a point on the plate 4.

Much as the aperture forms a virtual output source, it also forms a virtual detector surface. The optical processing of light before sensing by the detector makes the system uniformly sensitive at points on the aperture. The aperture is a substantially Lambertian detecting surface.

In this first example, the system 1A uses an active sensing approach, in that the system 1A also includes a source 10 of electromagnetic energy of the wavelength sensed by detector 9. The source 10 may be another solid state light emitter similar to the source 6, but configured to emit a wavelength not present in the output light C. It is also envisaged that the source 10 may be any other conventional source of electromagnetic energy (such as an incandescent lamp, a fluorescent lamp, an arc lamp, a halogen lamp, etc.) as long as the particular source 10 provides electromagnetic energy of the appropriate wavelength.

Examples are discussed later in which the detector is outside the cavity, and the source 10 is coupled to supply light into the interior of the optical integrating cavity, in a manner similar to the solid state light source (S) 6. However, in this first example, the source 10 is located for emission of electromagnetic energy of the particular wavelength from outside the optical integrating cavity 2 into at least a portion of the area intended to be illuminated by the virtual source light output C, that is to say without passage of the energy from the source 10 through the optical aperture 5. The source 10 may be mounted close to the cavity 2 and may be an integral part of a fixture that includes the cavity, the solid state light source (S) 6 and the detector 9. Alternatively, the source 10 may located at any other convenient position from which it may illuminate at least a portion of the area that the system 1A is intended to illuminate with the light output C.

The electromagnetic energy from the source 10 reflects back from one or more objects in the area illuminated by the system 1A. At least a portion of the reflected energy enters the optical integrating cavity 2 via the aperture 5. Such electromagnetic energy reflects one or more times off of the surfaces of the dome 3 and plate 4 that form the cavity 2. One or more such reflections will diffuse the reflected electromagnetic energy. At least a portion of the electromagnetic energy of the particular wavelength, that is diffusely reflected within the cavity 2, is coupled to and sensed by detector 9. In response, the detector 9 generates a signal that relates to the measured or sensed amount of that electromagnetic energy.

Figure 1B:
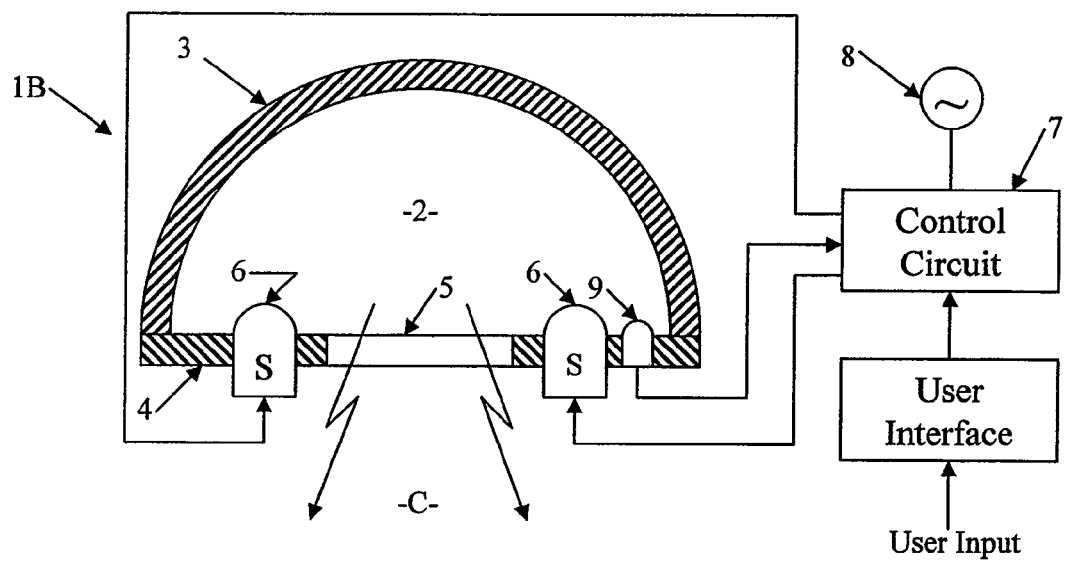
FIG. 1B illustrates another example of an intelligent light emitting system using a plurality of solid state light emitting elements and a feedback sensor, with certain elements of the fixture shown in cross-section.

FIG. 1B shows another example of an intelligent lighting system, that is to say system 1B. The system 1B, for example, includes an optical integrating cavity 2 similar to that discussed above relative to FIG. 1A. Again, the cavity 2 formed in the example by the dome 3 and the cover plate 4 has a reflective interior. At least one surface of the interior of the cavity 2 is diffusely reflective, so that the cavity diffusely reflects light and thereby integrates or combines light. The cavity 2 has an optical aperture for allowing emission of reflected light from within the interior of the cavity as combined light C directed into a region to facilitate a humanly perceptible lighting application for the system 1B. The integration in the cavity 2 effectively produces a virtual source of the output light C, in this case, again at the aperture 5.

In this type of exemplary system 1B, there are a number of solid state light emitting elements (S) 6 for emitting light, similar to the element(s) 6 used in the system 1A of FIG. 1A. At least one of the solid state light emitting elements 6 emits visible light energy. The other emitting element 6 typically emits visible light energy, although in some case the other element may produce other spectrums, e.g. in the ultraviolet (UV) or infrared (IR) portions of the electromagnetic spectrum. Each of the solid state light emitting elements (S) 6 supplies light (visible, UV or IR) into the cavity 2 at a point not directly observable through the aperture from the region. Light from each source 6 diffusely reflects at least once inside the cavity 2 before emission as part of the combined light C that emerges through the aperture 2. The system 1B could include a source of the additional wavelength, similar to the source 10 in the system 1A of FIG. 1A. However, in this example, the system does not include such an additional source. The system 1B may also include a user interface device for providing the means for user input.

As in the earlier example, the virtual source output light C has a spectral characteristic, typically in the visible light region of the spectrum. The system 1B also includes a detector 9, for sensing a characteristic of electromagnetic energy reflected within the cavity 5; and the detector 9 is a device of a type for sensing at least one wavelength of light not present in the spectrum of light generated for output C from the aperture 5 that forms the virtual source in this example. The wavelength may be a visible wavelength corresponding to a notch in the visible spectrum of output light C. In other examples where the output C is entirely in the visible light portion of the spectrum, the wavelength sensed by detector 9 is a wavelength outside the visible spectrum, for example in the near or far infrared (IR) range or in the ultraviolet (UV) range. Since the detector 9 senses a wavelength not present in the spectrum of light output C and thus absent from the light generated by the solid state source 6, the detector 9 is responsive to energy of that wavelength that enters the cavity 2 via the aperture 5 and reflects off the surface(s) of the cavity.

The system 1B uses a passive sensing approach, in that the system 1B relies on sensing of electromagnetic energy of the particular wavelength emitted or reflected from other sources within the illuminated area, without the system 1B itself supplying energy of that wavelength. For example, the sensor 9 may passively detect IR from one or more heat sources within a room illuminated by the system 1B, such as one or more persons who enter the room. The detector 9 is coupled to a location in the optical integrating cavity 2 at which at least a substantial portion of the electromagnetic energy of the particular wavelength that enters the cavity 2 through the optical aperture 5 is reflected one or more times off the reflective interior surface of the cavity 2 before reaching the location of coupling to the detector 9. One or more of the reflections will diffuse the reflected electromagnetic energy. The detector 9 may be located at or otherwise coupled to any such point on a surface of the cavity 2, typically a point not directly visible or illuminated through the aperture 5. In the example, the detector 9 is mounted to receive light at a point on the plate 4.

Hence, at least a portion of the electromagnetic energy of the particular wavelength, that is diffusely reflected within the cavity 2, is coupled to and sensed by detector 9. In response, the detector 9 generates a signal that relates to the measured or sensed amount of that electromagnetic energy. As in the earlier example, the detector 9 supplies the detection signal to the controller 7; and the controller 7 may control one or more operations of the system 1B in response to the detection signal. Alternatively, the controller 7 may process the signal for other purposes, e.g. to demodulate the signal to capture data that may be carried on the energy of the particular wavelength. For two-way communication, the controller might modulate the drive of the emitters 6 with downlink data, and the light sensed by the detector 9 would carry the uplink data.

Figure 1C:
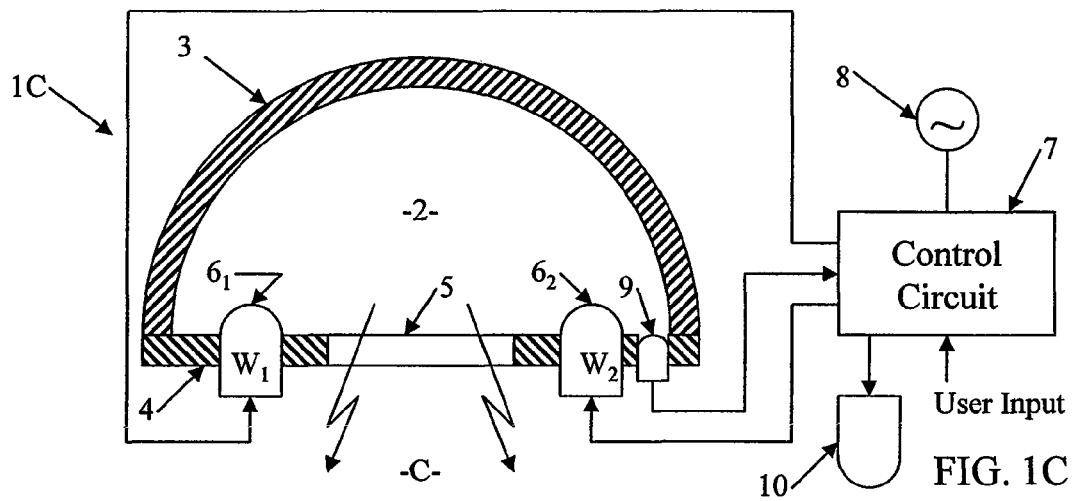
FIG. 1C illustrates another example of an intelligent light emitting system using white light type solid state light emitting elements of different color temperatures, with certain elements of the fixture shown in cross-section.

Some systems that use multiple solid state light emitting elements (S) 6 may use sources 6 of the same type, that is to say a set of solid state light emitting sources of a type intended to all produce electromagnetic energy of substantially the same spectral characteristic (assuming the same or similar supply of power). All of the sources may be identical white light (W) emitting elements or may all emit light of the same primary color. The system 1C (FIG. 1C) includes multiple white solid state emitting (S) $6_1$ and $6_2$. Although the two white light emitting elements could emit the same color temperature of white light, in this example, the two elements 6 emit white light of two different color temperatures.

The system 1C is generally similar to the system 1A discussed above, and similarly numbered elements have similar structures, arrangements and functions. However, in the system 1C the first solid state light emitting element $6_1$ is a white LED $W_1$ of a first type, for emitting white light of a first color temperature, whereas the second solid state light emitting element $6_2$ is a white LED $W_2$ of a second type, for emitting white light of a somewhat different second color temperature. Controlled combination of the two types of white light within the cavity 2 allows for some color adjustment, to achieve a color temperature of the combined light output C that is somewhere between the temperatures of the two white lights, depending on the amount of each white light provided by the two elements $6_1$ and $6_2$.

The system 1C implements a passive detection scheme, similar to that of the system 1B of FIG. 1B. In this example, the system 1C includes a detector 9 coupled to the cavity 2 to receive electromagnetic energy of the particular wavelength after diffuse reflection within the cavity 2. Assuming that the combined white light from the white solid state emitting sources (S) $6_1$ and $6_2$ includes wavelengths substantially throughout the visible portion of the spectrum, the detector 9 would be a type of device that is sensitive to one or more wavelengths outside the visible portion of the spectrum, e.g. for sensing near or far IR light or UV light.

Figure 1D:
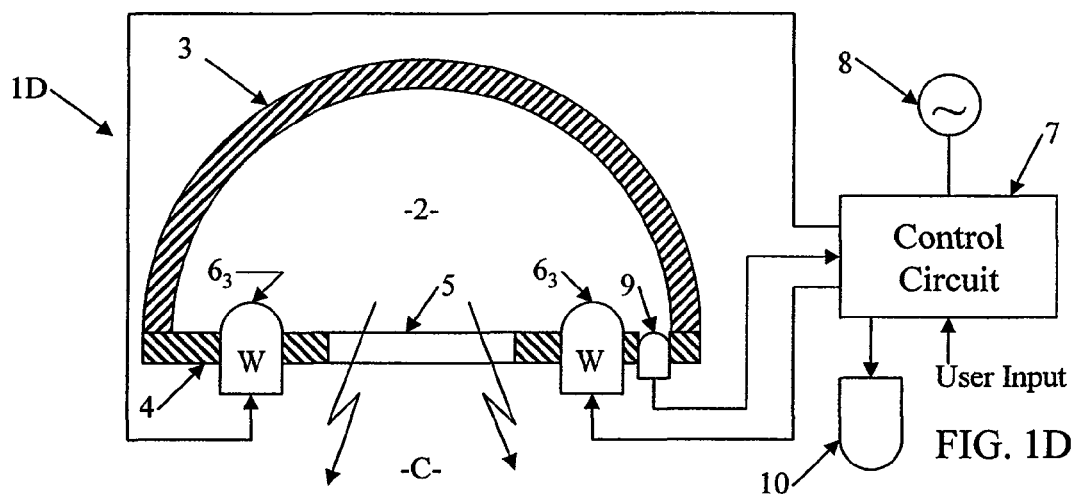
FIG. 1D illustrates another example of an intelligent light emitting system, using white type solid state light emitting elements of substantially the same color temperature, with certain elements of the fixture shown in cross-section.

FIG. 1D illustrates another system example 1D. The system 1D is similar to the system 1C discussed above, and similarly numbered elements have similar structures, arrangements and functions. However, in the system 1D the multiple solid state light emitting elements $6_3$ are white light emitters of the same type. Although the actual spectral output of the emitters $6_3$ may vary somewhat from device to device, the solid state light emitting elements $6_3$ are of a type intended to emit white light of substantially the same color temperature. The diffuse processing and combination of light from the solid state white light emitting elements $6_3$ provides a virtual source of uniform white light output over the area of the aperture 5, much like in the other embodiment of FIG. 1C. However, because the emitting elements $6_3$ all emit white light of substantially the same color temperature, the combined light C also has substantially the same color temperature.

Although applicable to all of the illustrated embodiments, it may be helpful at this point to consider an advantage of the fixture geometry and diffusely reflective processing by the cavity 2 in a bit more detail, with regard to the white light examples, particularly that of FIG. 1D.

The solid state light emitting elements 6 represent point sources. The actual area of light emission from each element 6 is relatively small. The actual light emitting chip area may be only a few square millimeters or less in area. The LED packaging often provides some diffusion, but this only expands the source area a bit, to tens or hundreds of millimeters. Such a concentrated point source output may be potentially hazardous if viewed directly. Where there are multiple solid state sources, when viewed directly, the sources appear as multiple bright light point sources.

The processing within the cavity 2, however, combines and spreads the light from the solid state light emitting elements 6 for virtual source output via the much larger area of the aperture 5. An aperture 5 with a two (2) inch radius represents a virtual source area of 12.6 square inches. Although the aperture 5 may still appear as a bright virtual light source, the bright light over the larger area will often represent a reduced hazard. The integration by the optical cavity also combines the point source light to form a uniform distribution at the virtual source. The uniform distribution extends over the optical output area of the virtual source, the area of aperture 5 in the example, which is larger than the combined areas of outputs of the point sources of light from the solid state emitters 6. The intensity at any point in the virtual source will be much less that that observable at the point of emission of one of the solid state light emitting elements 6. In the examples, the cavity 2 serves as an optical processing element to diffuse the light from the solid state light emitting element 6 over the virtual source output area represented by the aperture 5, to produce a light output through the optical output area that is sufficiently uniform across the virtual source area as to appear as an unpixelated light output.

The system 1D implements a passive detection scheme, similar to that of the system 1B of FIG. 1B. In this example, the system 1D includes a detector 9 coupled to the cavity 2 to receive electromagnetic energy of the particular wavelength after diffuse reflection within the cavity 2. Assuming that the white light from the white solid state emitting sources (S) $6_3$ includes wavelengths substantially throughout the visible portion of the spectrum, the detector 9 would be a type of device that is sensitive to one or more wavelengths outside the visible portion of the spectrum, e.g. for sensing near or far IR light or UV light.

Figure 1E:
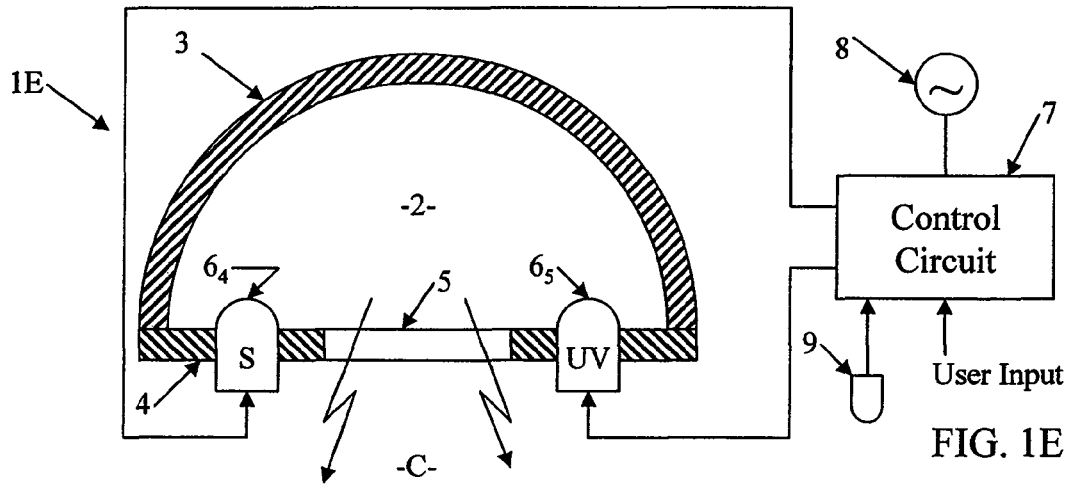
FIG. 1E illustrates an example of an intelligent light emitting system in which one of the solid state light emitting elements emits ultraviolet (UV) light.
Figure 1F:
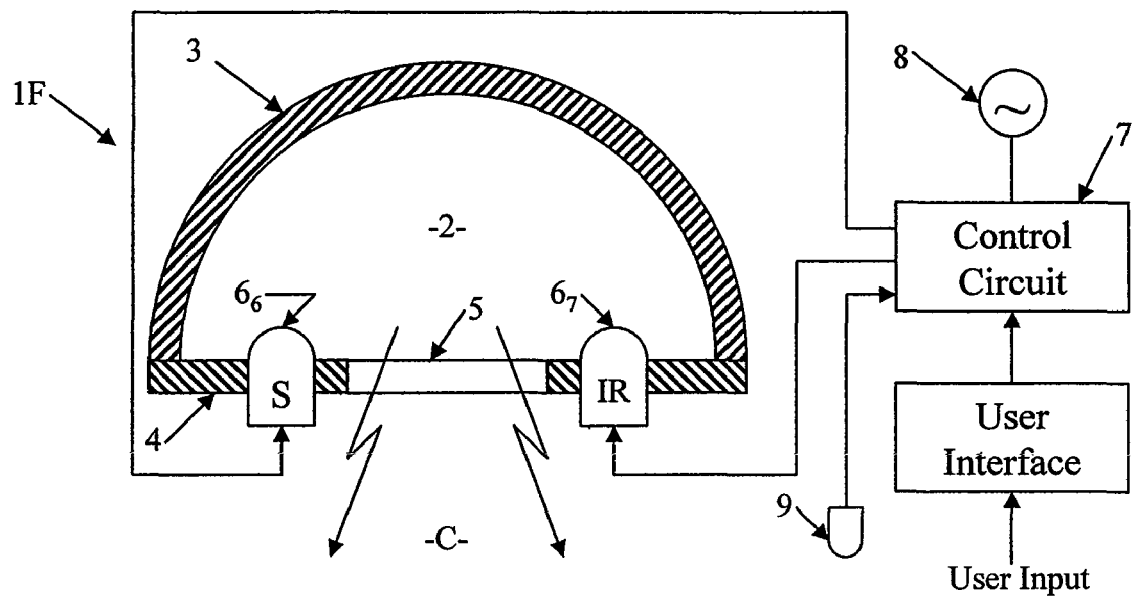
FIG. 1F illustrates an example of an intelligent light emitting system in which one of the solid state light emitting elements emits infrared (IR) light.

FIGS. 1E and 1F illustrate additional system examples, which include at least one solid state light emitting element for emitting light outside the visible portion of the electromagnetic spectrum. The system 1E is similar to the systems discussed above, and similarly numbered elements have similar structures, arrangements and functions. In the system 1E, one solid state light emitting element $6_4$ emits visible light, whereas another solid state light emitting element $6_5$ emits ultraviolet (UV) light. The cavity 2 reflects, diffuses and combines visible and UV light from the solid state light emitting element $6_4$ and $6_5$, in essentially the same manner as in the earlier visible light examples.

The system also includes a detector 9. In this case, the source 9 may be sensitive to energy of the wavelength produced by the UV source $6_5$, as that energy includes one or more light wavelengths outside the spectrum produced by the source $6_4$ used for the visible illumination application. In this example, the source $6_5$ is coupled to supply electromagnetic energy of the particular wavelength into the optical integrating cavity 2 in such a manner that substantially all energy of that wavelength emitted from the source $6_5$ reflects diffusely at least once within the interior of the optical integrating cavity 2 before emission with the diffusely reflected visible light C through the optical aperture 5 toward the region or area to be illuminated by the system 1E. If the detector 9 were coupled to receive light within the cavity, as in the earlier embodiments, it would be flooded by the light from the source $6_5$ that is inside the cavity and not yet emitted through the aperture 5 and could not sense reflected light of that wavelength coming back from the illuminated region. Hence, the detector 9 in this example is located separately and not coupled to the cavity 2. The detector 9 detects reflected UV electromagnetic energy from the illuminated region. After reflection off of a person or object in the region, the reflected UV light reaches the detector 9 without passage of the reflected UV light energy through the optical aperture 5.

The system 1F is similar to the systems discussed above, particularly the system 1B of FIG. 1B, and similarly numbered elements have similar structures, arrangements and functions. In the system 1F, one solid state light emitting element $6_6$ emits visible light for visible illumination or other lighting applications, whereas another solid state light emitting element $6_7$ emits infrared (IR) light. The IR light from element $6_7$ is outside the spectrum of light produced by the solid state light emitting element $6_6$. The cavity 2 reflects, diffuses and combines visible and IR light from the solid state light emitting elements $6_6$ and $6_7$ in essentially the same manner as in the earlier examples.

The detector 9 in this example is mounted separately so as to not receive light via the cavity 2. Instead, the detector 9 detects reflected or separately generated electromagnetic energy from the illuminated region. After reflection off of a person or object in the region, the reflected light reaches the detector 9 without passage of the reflected light energy through the optical aperture 5. The detector 9 could detect a wavelength of visible light that is absent from the light produced by source $6_6$, the detector 9 may detect IR light produced by source $6_7$ reflected back from persons or objects within the area illuminated by the system 1F, or the detector 9 may detect IR or other light of a wavelength different from that produced by source $6_7$.

In an example where the control 7 controls operation of the system in response to the detection signal, the detector 9 would typically detect IR light of the same wavelength(s) as produced by the solid state light emitting element $6_7$. If the reflected IR light of that spectral characteristic from the illuminated region changes by a predetermined amount, the controller would change the operating condition/state of the system 1F. IR detection, whether passive or active, can be used as an occupancy detection. When a person enters the illuminated area (when previously unoccupied), the controller turns ON the visible light emissions or turns-up the intensity. The controller keeps the visible light ON while the area is occupied. After all persons leave, and the area is unoccupied for more than some minimal time, the controller turns down or OFF the visible light output.

The illustrated IR emission and detection of FIG. 1F may be used in a different manner, for data communications. It is possible to modulate the operations of the IR solid state light emitting element $6_7$ to carry data. Typically, the IR solid state light emitting element $6_7$ would emit modulated light of a first infrared wavelength. A receiver (not shown) in the illuminated area would pick up that light, demodulate it and recover the data. The detector 9 in turn would sense IR light of a second infrared wavelength that is different from the first infrared wavelength. In this way, the detector would not be sensitive to reflections of the modulated IR light from the light emitting element $6_7$. The detector 9 would supply its sensing signal to the control circuit 7. Although the control might control system operation in response to that signal, assume now that the control processes the signal for a different purpose, to recover data. A transmitter (not shown) would modulate IR light of the wavelength that the detector 9 is configured to sense with data. The detection signal from the detector 9 could be demodulated to capture that data.

The data communications capabilities offered by the IR solid state light emitting element $6_7$ and the IR sensitive detector 9 could be used for two-way communication of data regarding system operation, e.g. remote control and associated responsive signaling. However, these communications could enable use of the system for more general two-way data communications, e.g. as a two-way wireless interface to a data network.

In the example of FIG. 1F, the detector 9 is shown as a separate element for sensing light reflected or generated in the illuminate region without passing through the aperture from the reflection point or source. However, if there is sufficient wavelength separation between the wavelength emitted by light emitting element $6_7$ and the wavelength sensed by the detector 9, the detector 9 would be coupled to receive light reflected within the cavity, in a manner similar to that in the example of FIG. 1.

Applications are also disclosed that utilize sources of two, three or more different types of light sources, that is to say solid state light sources that produce electromagnetic energy of two, three or more different spectral characteristics. Many such examples include sources of visible red (R) light, visible green (G) light and visible blue (B) light or other combinations of primary colors of light. Controlled amounts of light from primary color sources can be combined to produce light of many other visible colors, including various temperatures of white light. It may be helpful now to consider several more detailed examples of lighting systems using solid state light emitting elements. A number of the examples, starting with that of FIG. 2 use RGB LEDs or similar sets of devices for emitting three or more colors of visible light for combination within the optical integrating cavity and virtual source emission.

Figure 2:
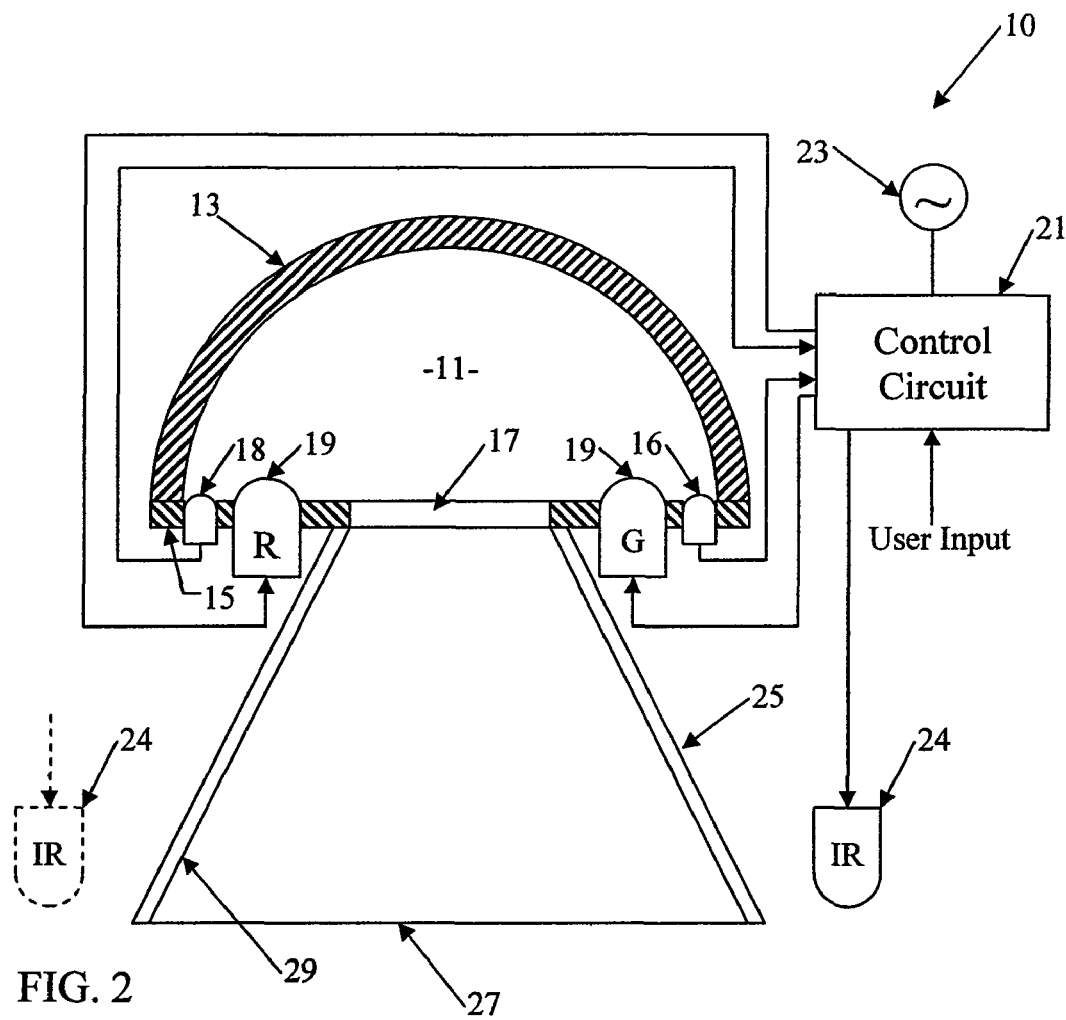
FIG. 2 illustrates an example of an intelligent radiant energy emitting system using primary color LEDs as solid state light emitting elements, with certain fixture elements shown in cross-section.

FIG. 2 is a cross-sectional illustration of a radiant energy distribution apparatus or system 20. For task lighting applications and the like, the apparatus emits light in the visible spectrum, although the system 20 may be used for lumination applications and/or with emissions in or extending into the infrared and/or ultraviolet portions of the radiant energy spectrum.

The illustrated system 20 includes an optical cavity 11 having a diffusely reflective interior surface, to receive and diffusely process radiant energy of different colors/wavelengths. The cavity 11 may have various shapes. The illustrated cross-section would be substantially the same if the cavity 11 is hemispherical or if the cavity is semi-cylindrical with the cross-section taken perpendicular to the longitudinal axis. The optical cavity 11 in the examples discussed below is typically an optical integrating cavity.

The disclosed apparatus may use a variety of different structures or arrangements for the optical integrating cavity, several examples of which are discussed below. At least a substantial portion of the interior surface(s) of the cavity exhibit(s) diffuse reflectivity. It is desirable that the cavity surface have a highly efficient reflective characteristic, e.g. a reflectivity equal to or greater than 90%, with respect to the relevant wavelengths. In the example of FIG. 2, the surface is highly diffusely reflective to energy in the visible, near-infrared, and ultraviolet wavelengths.

The cavity 11 may be formed of a diffusely reflective plastic material, such as a polypropylene having a 97% reflectivity and a diffuse reflective characteristic. Such a highly reflective polypropylene is available from Ferro Corporation—Specialty Plastics Group, Filled and Reinforced Plastics Division, in Evansville, Ind. Another example of a material with a suitable reflectivity is SPECTRALON. Alternatively, the optical integrating cavity may comprise a rigid substrate having an interior surface, and a diffusely reflective coating layer formed on the interior surface of the substrate so as to provide the diffusely reflective interior surface of the optical integrating cavity. The coating layer, for example, might take the form of a flat-white paint or white powder coat. A suitable paint might include a zinc-oxide based pigment, consisting essentially of an uncalcined zinc oxide and preferably containing a small amount of a dispersing agent. The pigment is mixed with an alkali metal silicate vehicle-binder, which preferably is a potassium silicate, to form the coating material. For more information regarding the exemplary paint, attention is directed to U.S. patent application Ser. No. 09/866,516, which was filed May 29, 2001, by Matthew Brown, which issued as U.S. Pat. No. 6,700,112 on Mar. 2, 2004.

For purposes of the discussion, the cavity 11 in the apparatus 20 is assumed to be hemispherical. In the example, a hemispherical dome 13 and a substantially flat cover plate 15 form the optical cavity 11. At least the interior facing surfaces of the dome 13 and the cover plate 15 are highly diffusely reflective, so that the resulting cavity 11 is highly diffusely reflective with respect to the radiant energy spectrum produced by the device 20. As a result, the cavity 11 is an integrating type optical cavity. Although shown as separate elements, the dome and plate may be formed as an integral unit. For example, rectangular cavities are contemplated, in which the dome and plate are elements of a unitary extruded member.

The optical integrating cavity 11 has an aperture 17 for allowing emission of combined radiant energy. In the example, the optical aperture 17 is a passage through the approximate center of the cover plate 15, although the aperture may be at any other convenient location on the plate 15 or the dome 13. Because of the diffuse reflectivity within the cavity 11, light within the cavity is integrated or combined before passage out of the aperture 17. As in the earlier examples, this diffuse processing of light produces a virtual light source at the aperture 17. If as illustrated the actual sources emit light of two or more different colors, the virtual source appears as a source of a color of light that results from the combination of the colors from the actual sources.

The integration produces a highly uniform light distribution across the aperture 17 of the cavity 11, which forms the virtual output area and often forms all or a substantial part of the output area of the fixture. Typically, the distribution of light across the aperture 17 is substantially Lambertian. During operation, when viewed from the area illuminated by the combined light, the aperture 17 appears to be a light source of substantially infinite depth of the combined color of light. Also, the visible intensity is spread uniformly across the aperture 17, as opposed to individual small point sources as would be seen if the one or more of the light emitting elements were directly visible. This conversion to a virtual source, by spreading of the light over the aperture area, reduces or eliminates hazards from direct view of intense solid state point sources. The virtual source fixture output is relatively uniform across the apparent output area of the virtual source, e.g. across the optical aperture 17 of the cavity 11. Typically, the virtual source light output exhibits a relatively low maximum-to-minimum intensity ratio across the area of the aperture 17. In the example, the virtual source light output exhibits a maximum-to-minimum ratio of 2 to 1 (2:1) or less over substantially the entire virtual source optical output area represented by the aperture 17.

In the examples, the apparatus 20 is shown emitting the radiant energy downward from the virtual source, that is to say downward through the aperture 17, for convenience. However, the apparatus 20 may be oriented in any desired direction to perform a desired application function, for example to provide visible luminance to persons in a particular direction or location with respect to the fixture or to illuminate a different surface such as a wall, floor or table top. Also, the optical integrating cavity 11 may have more than one aperture 17, for example, oriented to allow emission of integrated light in two or more different directions or regions.

The apparatus 20 also includes solid state light emission sources of radiant energy of different wavelengths. In this example, the solid state sources are LEDs 19, two of which are visible in the illustrated cross-section. The LEDs 19 supply radiant energy into the interior of the optical integrating cavity 11. As shown, the points of emission into the interior of the optical integrating cavity are not directly visible through the aperture 17. Direct emissions from the LEDs 19 are directed toward the diffusely reflective inner surface of the dome 13, so as to diffusely reflect at least once within the cavity 11 before emission in the combined light passing out of the cavity through the aperture 17. At least the two illustrated LEDs 19 emit radiant energy of different wavelengths, e.g. Red (R) and Green (G). Additional LEDs of the same or different colors may be provided. The cavity 11 effectively integrates the energy of different wavelengths, so that the integrated or combined radiant energy emitted through the aperture 17 forms a virtual source of light that includes the radiant energy of all the various wavelengths in relative amounts substantially corresponding to the relative amounts of input into the cavity 11 from the respective LEDs 19.

The source LEDs 19 can include LEDs of any color or wavelength. Typically, an array of primary color LEDs for a visible light application includes at least red, green, and blue LEDs. The integrating or mixing capability of the cavity 11 serves to project light of any color, including white light, by adjusting the intensity of the various sources coupled to the cavity. Hence, it is possible to control color rendering index (CRI), as well as color temperature. The system 20 works with the totality of light output from a family of LEDs 19. However, to provide color adjustment or variability, it is not necessary to control the output of individual LEDs, except as they contribute to the totality. For example, it is not necessary to modulate the LED outputs, although modulation may be used if desirable for particular applications. Also, the distribution pattern of the individual LEDs and their emission points into the cavity are not significant. The LEDs 19 can be arranged in any manner to supply radiant energy within the cavity, although it is preferred that direct view of the LEDs from outside the fixture is minimized or avoided.

In this example, light outputs of the LED sources 19 are coupled directly to openings at points on the interior of the cavity 11, to emit radiant energy directly into the interior of the optical integrating cavity. Direct emissions are aimed at a reflective surface of the cavity. The LEDs 19 may be located to emit light at points on the interior wall of the element 13, although preferably such points would still be in regions out of the direct line of sight through the aperture 17. For ease of construction, however, the openings for the LEDs 19 are formed through the cover plate 15. On the plate 15, the openings/LEDs may be at any convenient locations. From such locations, all or substantially all of the direct emissions from the LEDs 19 impact on the internal surface of the dome 13 and are diffusely reflected.

The exemplary system 20 also includes a sensor or detector 16, for sensing a characteristic of the reflected light from within the interior of the cavity 11. The sensor 16, for example, may detect intensity of the combined light in the cavity 11. As another example, the sensor may provide some indication of the spectral characteristic of the combined light in the cavity 11. The detector 16 operates as a feedback sensor, for use in controlling system operations. Although the detector 16 could also sense intensity of one or more additional wavelengths (analogous to operation of detector 9 in the earlier examples), typically, the intensity and/or spectral characteristic sensed by detector 16 is that of the light produced by the diffuse processing of the light from the LEDs 19 within the cavity 11 for the illumination application. In such arrangements, the signal from the detector 16 is used for feedback purposes.

The exemplary system 20 also includes a sensor or detector 18 for detecting an amount (e.g. intensity) of electromagnetic energy of a wavelength that is absent from the light produced by the LEDs 19 and/or the diffuse processing of the light from the LEDs 19 within the cavity 11. In this example, the RGB LEDs 19 produce visible light, and the combined light produced by diffuse reflection of the light from the LEDs 19 within the cavity 11 is visible light. It is intended that adjustment of the amounts of light from the LEDs will enable selection of the spectral characteristic of the visible light output of the system over a substantial range of the visible light portion of the electromagnetic spectrum. Hence, the detector 18 is of a type or configuration for sensing at least one wavelength outside of the visible light portion of the electromagnetic spectrum. Although the detector 18 might sense UV light or other non-visible wavelengths, in the example of system 20, the detector 18 senses IR light energy in the near IR range or in the far IR range.

The detector 18 is coupled to receive light from within or on a wall of the cavity 11 so that the detector 18 senses a characteristic of electromagnetic energy diffusely reflected within the cavity 11. The detector may be located at or otherwise coupled to any convenient point on or within the cavity 11, although typically the point is on a wall of the cavity and located so that light entering through the aperture 17 reflects diffusely one or more times within the cavity before reaching the point of coupling to the detector 18. Since the detector 18 senses a wavelength not present in the spectrum of light output by the LEDs 19, the detector 18 is responsive to energy of that wavelength that enters the cavity 11 via the aperture 17 and reflects off the surface(s) of the cavity 11.

The apparatus 20 also includes a control circuit 21 coupled to the LEDs 19 for establishing output intensity of radiant energy of each of the LED sources. The control circuit 21 is responsive to detection signals supplied by the detectors 16 and 18. The control circuit 21 typically includes a power supply circuit coupled to a source, shown as an AC power source 23. The control circuit 21 also includes an appropriate number of LED driver circuits for controlling the power applied to each of the different color LEDs 19 and thus the amount of radiant energy supplied to the cavity 11 for each different wavelength. It is possible that the power could be modulated to control respective light amounts output by the LEDs 19, however, in the examples, LED outputs are controlled by controlling the amount of power supplied to drive respective LEDs. Such control of the amount of light emission of the sources sets a spectral characteristic of the combined radiant energy emitted through the aperture 17 of the optical integrating cavity. The control circuit 21 may be responsive to a number of different control input signals, for example, to one or more user inputs as shown by the arrow in FIG. 2. Specific examples of the control circuitry are discussed in more detail later.

The system 20 also includes a source 24 of IR light, that is to say of at least one wavelength absent from the light produced by the LEDs 19 and the combined light output emitted through the aperture 17. The source 24 may emit light of a different wavelength from that sensed by the detector 18, as discussed earlier, but in this example, the IR source 24 emits light of a wavelength that the detector 18 will sense. The IR source 24 may be mounted on or near the fixture but outside the cavity 11, or the IR source 24 may be mounted at a different location. The IR source could be directed from the illuminated area toward the aperture for some applications; but in the example, the source 24 is oriented to direct its output away from the fixture and into a portion of the area illuminated by the fixture. Hence, the IR light from the source 24 illuminates at least a portion of a region intended to be illuminated by the combined light output from the aperture 17. One or more additional sources 24 (shown in dotted line form) may also be provided.

The aperture 17 may serve as the system output, directing integrated color light of relatively uniform intensity distribution to a desired area or region to be illuminated. Although not shown in this example, the aperture 17 may have a grate, lens or diffuser (e.g. a holographic element) to help distribute the output light and/or to close the aperture against entry of moisture of debris. For some applications, the system 20 includes an additional downstream optical processing element, such as deflector, diffuser, filter or the like.

The exemplary apparatus 20 shown in FIG. 2 comprises a deflector 25, as the additional optical processing element. The deflector 25 has a reflective inner surface 29, to efficiently direct most of the light emerging from a light source at aperture C into a relatively narrow field of view. A small opening at a proximal end of the deflector is coupled to the aperture 17 of the optical integrating cavity 11. The deflector 25 has a larger opening 27 at a distal end thereof. Although other shapes may be used, the deflector 25 is conical. The angle and distal opening of the conical deflector 25 define an angular field of radiant energy emission from the apparatus 20. Although not shown, the large opening of the deflector may be covered with a transparent plate or lens, or covered with a grating, to prevent entry of dirt or debris through the cone into the system and/or to further process the output radiant energy.

The deflector 25 may have a variety of different shapes, depending on the particular lighting application. In the example, where cavity 11 is hemispherical, the cross-section of the conical deflector is typically circular. However, the deflector may be somewhat oval in shape. In applications using a semi-cylindrical cavity, the deflector may be elongated or even rectangular in cross-section. The shape of the aperture 17 also may vary, but will typically match the shape of the small end opening of the deflector 25. Hence, in the example, the aperture 17 would be circular. However, for a device with a semi-cylindrical cavity and a deflector with a rectangular cross-section, the aperture may be rectangular.

The deflector 25 comprises a reflective interior surface 29 between the distal end and the proximal end. In some examples, at least a substantial portion of the reflective interior surface 29 of the conical deflector exhibits specular reflectivity with respect to the integrated radiant energy. As discussed in U.S. Pat. No. 6,007,225, for some applications, it may be desirable to construct the deflector 25 so that at least some portion(s) of the inner surface 29 exhibit diffuse reflectivity or exhibit a different degree of specular reflectivity (e.g., quasi-secular), so as to tailor the performance of the deflector 25 to the particular application. For other applications, it may also be desirable for the entire interior surface 29 of the deflector 25 to have a diffuse reflective characteristic. In such cases, the deflector 25 may be constructed using materials similar to those taught above for construction of the optical integrating cavity 11.

In the illustrated example, the large distal opening 27 of the deflector 25 is roughly the same size as the cavity 11. In some applications, this size relationship may be convenient for construction purposes. However, a direct relationship in size of the distal end of the deflector and the cavity is not required. The large end of the deflector may be larger or smaller than the cavity structure. As a practical matter, the size of the cavity is optimized to provide the integration or combination of light colors from the desired number of LED sources 19. The size, angle and shape of the deflector determine the area that will be illuminated by the combined or integrated light emitted from the cavity 11 via the aperture 17 and the field of view of the cavity for purposes of receiving IR light for sensing by detector 18.

In the example, each solid state source of radiant energy of a particular wavelength comprises one or more light emitting diodes (LEDs). Within the chamber, it is possible to process light received from any desirable number of such LEDs. Hence, in several examples including that of FIG. 2, the sources may comprise one or more LEDs for emitting light of a first color, and one or more LEDs for emitting light of a second color, wherein the second color is different from the first color. Each LED represents a point source of a particular color, which in the RGB example, is one of three primary colors. The diffuse processing converts the point source lights to a single combined virtual source light at the aperture. In a similar fashion, the apparatus may include additional sources comprising one or more LEDs of a third color, a fourth color, etc.; and the diffuse processing combines those additional lights into the virtual source light output. To achieve the highest color rendering index (CRI) at the virtual source output, the LED array may include LEDs of various wavelengths that cover virtually the entire visible spectrum. Examples with additional sources of substantially white light are discussed later.

Each of the detectors 16 and 18 supplies a detection signal to the control circuit 21. The detector 16 provides feedback as to the operation of the system 20, and the controller in circuit 21 uses that signal to adjust one or more operation parameters of the LED outputs, in a manner intended to achieve and maintain intensity and/or color output settings. As noted above, the detector 18 senses an amount of energy of the particular wavelength that is received back from the illuminated area and reflected within the cavity 11. Although the controller could process or use the signal in other ways (e.g. to receive data for remote control or communication purposes), in this example, the controller 21 controls one or more operations of the system 20 in response to the detection signal from the detector 18. The IR light from source 24 and the attendant IR reflection sensed by detector 18 for example may provide a system for active detection of whether or not the area illuminated by the system is occupied. Hence, in response to occupancy conditions indicated by the signal from the detector 18, the control circuit 21 can turn the LEDs 190N and OFF, or the controller may vary the amount of output (while ON) of one or more colors of LEDs to adjust the output intensity and/or color in some manlier.

A number of different examples of control circuits are discussed below. In one example, the control circuitry comprises a color feedback sensor coupled to detect color distribution in the integrated radiant energy. Associated logic circuitry, responsive to the detected color distribution, controls the output intensity of the various LEDs, so as to provide a desired color distribution in the integrated radiant energy. In an example using sleeper LEDs, the logic circuitry is responsive to the detected color distribution to selectively activate the inactive light emitting diodes as needed, to maintain the desired color distribution in the integrated radiant energy.

The inventive devices have numerous applications, and the output intensity and spectral characteristic may be tailored and/or adjusted to suit the particular application. For example, the intensity of the integrated radiant energy emitted through the aperture may be at a level for use in a luminance application or at a level sufficient for a task lighting application or other type of general lighting application. A number of other control circuit features also may be implemented. For example, the control circuit 21 may turn ON/OFF the LEDs based on occupancy in response to the signal from detector 18, but while ON, maintain a set color characteristic in response to color feedback from a sensor 16. The control circuitry 21 may also include a temperature sensor. In such an example, the logic circuitry is also responsive to the sensed temperature, e.g. to reduce intensity of the source outputs to compensate for temperature increases. The control circuitry 21 may include a user interface device or receive signals from a separate user interface device, for manually setting the desired spectral characteristic. For example, an integrated user interface might include one or more variable resistors or one or more dip switches directly connected into the control circuitry, to allow a user to define or select the desired color distribution and/or intensity.

Communication in support of or in addition to the control functions also is envisioned. For example, the control circuitry may include a data interface coupled to the logic circuitry, for receiving data defining the desired intensity and/or color distribution. Such an interface would allow input of control data from a separate or even remote device, such as a personal computer, personal digital assistant or the like. A number of the devices, with such data interfaces, may be controlled from a common central location or device. Such a communication interface to the control circuitry may also provide a link to a network, e.g. when the source 24 and detector 18 are used for two-way IR transport of wireless data signals.

The control may be somewhat static, e.g. to set the desired color reference index or desired color temperature and the overall intensity, and leave the device set-up in that manner for an indefinite period unless or until a detected change in occupancy status. In the ON state, the apparatus also may be controlled dynamically, for example, to provide special effects lighting. Where a number of the devices are arranged in a large two-dimensional array, dynamic control of color and intensity of each unit could even provide a video display capability, for example, for use as a "Jumbo Tron" view screen in a stadium or the like. In product lighting or in personnel lighting (for studio or theater work), the lighting can be adjusted for each product or person that is illuminated. Also, such light settings are easily recorded and reused at a later time or even at a different location using a different system.

Figure 3:
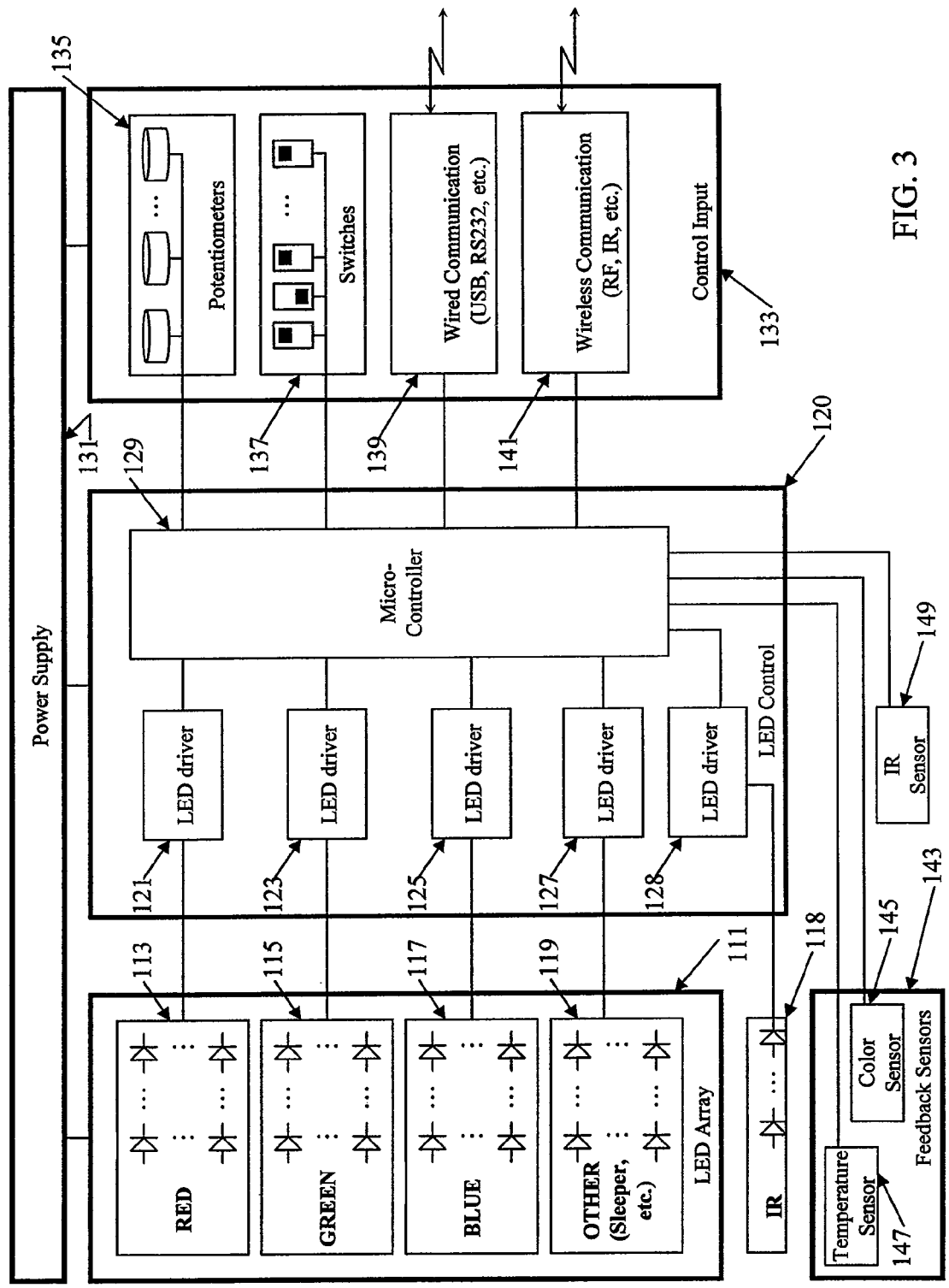
FIG. 3 is a functional block diagram of the electrical components, of one of the intelligent systems, using programmable digital control logic.

To appreciate the features and examples of the control circuitry outlined above, it may be helpful to consider a more detailed example of the circuitry with reference to an appropriate diagram. FIG. 3 is a block diagram of exemplary circuitry for the sources and associated control circuit, providing digital programmable control, which may be utilized with a light integrating fixture of the type described above. As discussed below, the illustrated circuitry also includes an IR source and IR detector corresponding to those of the system 20 of FIG. 2, although similar circuitry could be used with sources and detectors for emitting/sensing other wavelengths as outlined in several of the examples above.

In this circuit example (FIG. 3), the solid state sources of radiant energy of the various types take the form of an LED array 111. Arrays of one, two or more colors may be used. The illustrated array 111 comprises two or more LEDs of each of three primary colors, red green and blue, represented by LED blocks 113, 115 and 117. For example, the array may comprise six red LEDs 113, three green LEDs 115 and three blue LEDs 117.

The LED array 111 in this example also includes a number of additional or "other" LEDs 119. There are several types of additional LEDs that are of particular interest in the present discussion. One type of additional LED provides one or more additional wavelengths of radiant energy for integration within the chamber for use in the illumination application. The additional wavelengths may be in the visible portion of the light spectrum, to allow a greater degree of color adjustment.

The second type of additional LED that may be included in the system is a "sleeper" LED. Sleeper LEDs provide redundant light generation capacity, particularly with respect to light used for the illumination application. Some LEDs would be active, whereas the sleepers would be inactive, at least during initial operation. Using the circuitry of FIG. 3 as an example, the Red LEDs 113, Green LEDs 115 and Blue LEDs 117 might normally be active. The LEDs 119 would be sleeper LEDs, typically including one or more LEDs of each color used in the particular system. The controller activates sleepers on an as-needed basis, e.g. to compensate for declining LED performance as indicated by a feedback signal from a detector.

The third type of other LED of interest is a white LED. The entire array 111 may consist of white LEDs of one, two or more color temperatures. For white lighting applications using primary color LEDs (e.g. RGB LEDs), one or more white LEDs provide increased intensity; and the primary color LEDs then provide light for color adjustment and/or correction.

The 'other' LEDs 119 could produce energy of an additional wavelength not provided by the LEDs 113, 115 and 117 for the illumination application, e.g. one or more wavelengths outside the visible spectrum, such as in the infrared (IR) range or the ultraviolet (UV) range, as in some of the earlier examples. For discussion here, however, it is assumed that all of the LEDs in the array 111 emit visible light into the chamber and thus correspond to the LEDs 19 in the system 20 of FIG. 2.

The illustrated circuitry, however, also includes one or more sources of electromagnetic energy of at least one wavelength not produced by the LED array 111 or the processing of the lights from the LED array 111 within the optical integrating cavity. As in the example of FIG. 2, the additional source of such electromagnetic energy produces infrared (IR) light. Although other IR sources could be used, in the example, the circuitry includes one or more IR LEDs 118, which correspond to the IR sources 24 in the example of FIG. 2. Although not shown, there may be one or more IR sleeper LEDs, as well. The IR LEDs 118 may be coupled to the cavity or coupled to emit light outside the cavity (see FIGS. 1F and 2, respectively).

The electrical components shown in FIG. 3 also include an LED control system 120. The system 120 includes driver circuits for the various LEDs, as well as a microcontroller. The driver circuits supply electrical current to the respective LEDs 113, 115, 117 and 119 of the array 111 to cause the LEDs of the array to emit light. The driver circuit 121 drives the Red LEDs 113, the driver circuit 123 drives the green LEDs 115, and the driver circuit 125 drives the Blue LEDs 117. In a similar fashion, when active, the driver circuit 127 provides electrical current to the other LEDs 119. If the other LEDs provide another color of light, and are connected in series, there may be a single driver circuit 127. If the LEDs are sleepers, it may be desirable to provide a separate driver circuit 127 for each of the LEDs 119 or at least for each set of LEDs of a different color.

Since the source of the IR light comprises one or more LEDs 118, the LED control system 120 also includes a LED driver circuit 128 for providing electrical current to the IR LEDs 118. The microcontroller controls the driver circuits, including the driver circuit 128 for the IR LEDs 118, to establish respective output levels from the various LEDs.

Control of the LED outputs could be controlled by selective modulation of the drive signals applied to the various LEDs. In the example, the intensity of the emitted light of a given LED is proportional to the level of current supplied by the respective driver circuit. The current output of each driver circuit is controlled by the higher level logic of the system. In this digital control example, that logic is implemented by a programmable microcontroller 129, although those skilled in the art will recognize that the logic could take other forms, such as discrete logic components, an application specific integrated circuit (ASIC), etc. Although not separately shown, digital to analog converters (DACs) may be utilized to convert control data outputs from the microcontroller 129 to analog control signal levels for control of the LED driver circuits.

The LED driver circuits and the microcontroller 129 receive power from a power supply 131, which is connected to an appropriate power source (not separately shown). For most task-lighting applications and the like, the power source will be an AC line current source, however, some applications may utilize DC power from a battery or the like. The power supply 129 converts the voltage and current from the source to the levels needed by the driver circuits 121-128 and the microcontroller 129.

A programmable microcontroller typically includes or has coupled thereto random-access memory (RAM) for storing data and read-only memory (ROM) and/or electrically erasable read only memory (EEROM) for storing control programming and any pre-defined operational parameters, such as pre-established light 'recipes' or 'routines.' The microcontroller 129 itself comprises registers and other components for implementing a central processing unit (CPU) and possibly an associated arithmetic logic unit. The CPU implements the program to process data in the desired manner and thereby generates desired control outputs.

The microcontroller 129 will typically be on at all times that the system circuitry is connected to power, whether the system is emitting visible light or not. For at least some applications, such as where the IR is emitted and sensed for room or area occupancy detection, the microcontroller 129 is programmed to control the LED driver circuit 128 so that the IR LEDs 118 are substantially always active, although the output may be modulated if desirable.

The microcontroller 129 is programmed to control the LED driver circuits 121-127 to set the individual output intensities of the LEDs to desired levels, so that the combined light emitted from the aperture of the cavity has a desired spectral characteristic and a desired overall intensity. The microcontroller 129 may be programmed to convert color settings, input for example by a user, into appropriate intensity and/or modulation values for the various LED drive currents. The microcontroller 129 may be programmed to essentially establish and maintain or preset a desired 'recipe' or mixture of the available wavelengths provided by the LEDs used in the particular system. For some applications, the microcontroller may work through a number of settings over a period of time in a manner defined by a dynamic routine. The microcontroller 129 receives control inputs or retrieves a stored routine specifying the particular 'recipe' or mixture, as will be discussed below. To insure that the desired mixture is maintained, the microcontroller 129 receives a color feedback signal from an appropriate color sensor. The microcontroller may also be responsive to a feedback signal from a temperature sensor, for example, in or near the optical integrating cavity.

The electrical system will also include one or more control inputs 133 for inputting information instructing the microcontroller 129 as to the desired operational settings. A number of different types of inputs may be used and several alternatives are illustrated for convenience. A given installation may include a selected one or more of the illustrated control input mechanisms.

As one example, user inputs may take the form of a number of potentiometers 135. The number would typically correspond to the number of different light wavelengths provided by the particular LED array 111. The potentiometers 135 typically connect through one or more analog to digital conversion interfaces provided by the microcontroller 129 (or in associated circuitry). To set the parameters for the integrated light output, the user adjusts the potentiometers 135 to set the intensity for each color. The microcontroller 129 senses the input settings and controls the LED driver circuits accordingly, to set corresponding intensity levels for the LEDs providing the light of the various wavelengths.

Another user input implementation might utilize one or more dip switches 137. For example, there might be a series of such switches to input a code corresponding to one of a number of recipes or to a stored dynamic routine. The memory used by the microcontroller 129 would store the necessary intensity levels for the different color LEDs in the array 111 for each recipe and/or for the sequence of recipes that make up a routine. Based on the input code, the microcontroller 129 retrieves the appropriate recipe from memory. Then, the microcontroller 129 controls the LED driver circuits 121-127 accordingly, to set corresponding intensity levels for the LEDs 113, 115, 117 and 119 providing the light of the various wavelengths for the illumination application.

As an alternative or in addition to the user input in the form of potentiometers 135 or dip switches 137, the microcontroller 129 may be responsive to control data supplied from a separate source or a remote source. For that purpose, some versions of the system will include one or more communication interfaces. If the IR capabilities of the system are used for data communications to/from the illuminated area, the communication interface would provide a data link for sending and/or receiving such data via a local or wide area network. One example of a general class of such interfaces is a wired interface 139. One type of wired interface typically enables communications to and/or from a personal computer or the like, typically within the premises in which the fixture operates. Examples of such local wired interfaces include USB, RS-232, and wire-type local area network (LAN) interfaces. Other wired interfaces, such as appropriate modems, might enable cable or telephone line communications with a remote computer, typically outside the premises. Other examples of data interfaces provide wireless communications, as represented by the interface 141 in the drawing. Wireless interfaces, for example, use radio frequency (RF) links. The wireless communications may be local on-premises communications, analogous to a wireless local area network (WLAN). Alternatively, the wireless communications may enable communication with a remote device outside the premises, using wireless links to a wide area network, e.g. via a cellular network.

As noted above, the electrical components may also include one or more feedback sensors 143, to provide system performance measurements as feedback signals to the control logic, implemented in this example by the microcontroller 129. A variety of different sensors may be used, alone or in combination, for different applications. In the illustrated examples, the set 143 of feedback sensors includes a color sensor 145 and a temperature sensor 147. Although not shown, other sensors, such as an overall intensity sensor may be used. The sensors are positioned in or around the system to measure the appropriate physical condition, e.g. temperature, color, intensity, etc.

The color sensor 145, for example, is coupled to detect color distribution in the integrated radiant energy that the cavity produces via is reflective processing of light from the visible light generating LEDs 113, 115, 117 and 119. The color sensor 145 may be coupled to sense energy within the optical integrating cavity, within the deflector (if provided) or at a point in the field illuminated by the particular system. Various examples of appropriate color sensors are known. For example, the color sensor may be a digital compatible sensor, of the type sold by TAOS, Inc. Another suitable sensor might use the quadrant light detector disclosed in U.S. Pat. No. 5,877,490, with appropriate color separation on the various light detector elements (see U.S. Pat. No. 5,914,487 for discussion of the color analysis).

The associated logic circuitry, responsive to the detected color distribution, controls the output intensity of the various LEDs, so as to provide a desired color distribution in the integrated radiant energy, in accord with appropriate settings. In an example using sleeper LEDs, the logic circuitry is responsive to the detected color distribution to selectively activate the inactive light emitting diodes as needed, to maintain the desired color distribution in the integrated radiant energy. The color sensor measures the color of the integrated radiant energy produced by the system and provides a color measurement signal to the microcontroller 129. If using the TAOS, Inc. color sensor, for example, the signal is a digital signal derived from a color to frequency conversion. The TAOs sensor is responsive to instructions from the microcontroller 129 to selectively measure overall intensity, Red intensity, Green intensity and Blue intensity.

The temperature sensor 147 may be a simple thermo-electric transducer with an associated analog to digital converter, or a variety of other temperature detectors may be used. The temperature sensor is positioned on or inside of the fixture, typically at a point that is near the LEDs or other sources that produce most of the system heat. The temperature sensor 147 provides a signal representing the measured temperature to the microcontroller 129. The system logic, here implemented by the microcontroller 129, can adjust intensity of one or more of the LEDs in response to the sensed temperature, e.g. to reduce intensity of the source outputs to compensate for temperature increases. The program of the microcontroller 129, however, would typically manipulate the intensities of the various LEDs so as to maintain the desired color balance between the various wavelengths of light used in the system, even though it may vary the overall intensity with temperature. For example, if temperature is increasing due to increased drive current to the active LEDs (with increased age or heat), the controller may deactivate one or more of those LEDs and activate a corresponding number of the sleepers, since the newly activated sleeper(s) will provide similar output in response to lower current and thus produce less heat.

As in the earlier examples, the system of FIG. 3 includes a detector for sensing at least one wavelength of electromagnetic energy that is not contained in the light generated by the LEDs 113, 115, 117 and 119 (or by the processing of that light within the optical integrating cavity). Although such a detector may detect energy in other spectral regions, in this circuit example, the system includes an IR detector or sensor 149. The detector may receive IR light directed from the region illuminated by the system, but for discussion purposes, it is assumed here that the IR sensor 149 is coupled to receive IR light energy via an optical integrating chamber, in a manner similar to the detector 18 in the example of FIG. 2. Any of a variety of available IR sensors may be used.

The sensor 149 generates a detection signal proportional in some known manner to the amount of IR light energy reaching the optical input to the sensor 149. The sensor 149 provides this detection signal to the microcontroller 129 for processing for example as a pulse train of a frequency proportional to the amount of sensed IR light or as digitized amplitude signal proportional to the sensed IR light. As discussed earlier, the detected IR light may carry data, in which case the microcontroller demodulates the detection signal to capture or recover the data carried by the IR light, for remote control or data communication purposes. For purposes of further discussion here, however, it is assumed that the microcontroller 129 processes the detection signal from the IR sensor 149 to detect changes in IR light from the illuminated region, in a manner intended to facilitate detection of occupancy of that region and thus to control system operations accordingly. Further discussion of an example of occupancy detection and attendant control refers to FIGS. 4, 5A and 5B.

The occupancy responsive control may control a variety of operating parameters of the solid state lighting system. For example, the microcontroller 129 could control color of the combined light output. As another example, the processor might set different levels of intensity of the combined light output for different detect occupancies states, e.g. OFF when unoccupied, low-level ON when occupied by one or a small number of people, or ON high intensity when occupied by a large number of people.

Figure 4:
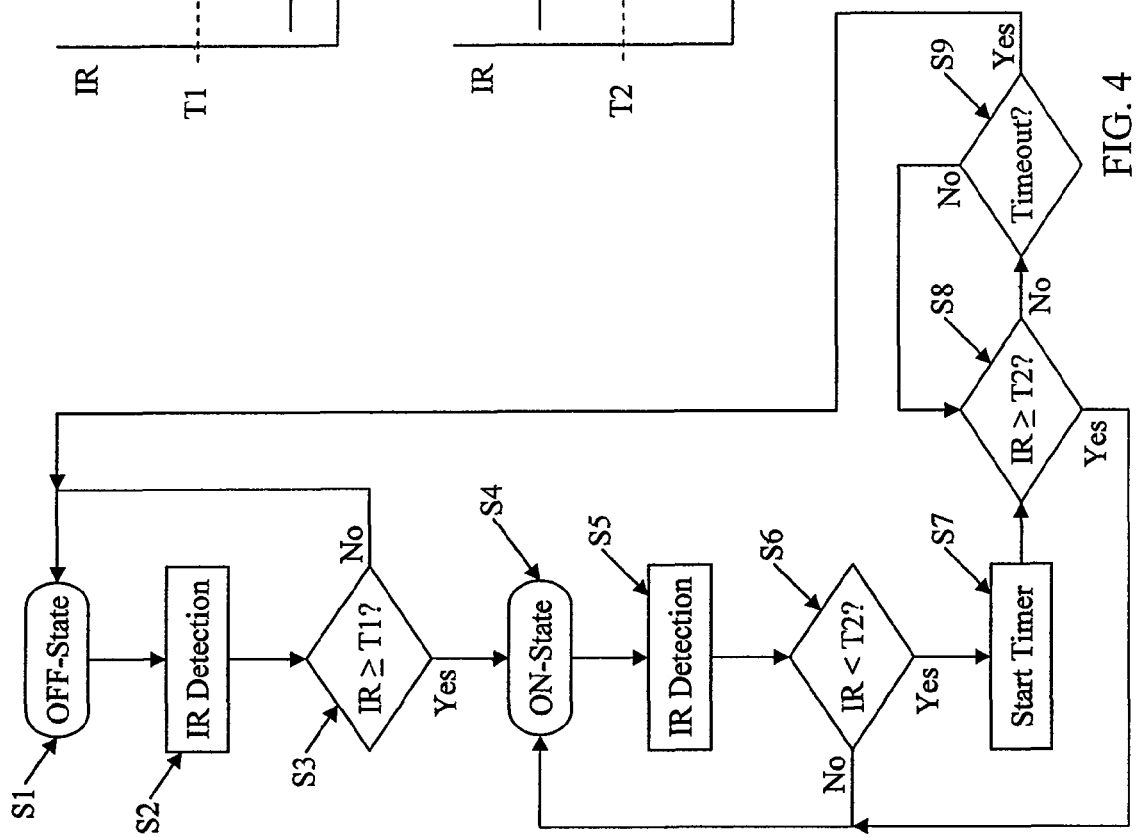
FIG. 4 is a flow chart illustrating use of an intelligent solid state lighting system, with the sensing and processing configured for occupancy detection and attendant control of the operation of the lighting system.

FIG. 4 is a flow chart illustrating the processing of the IR sensor signal to detect occupancy status and provide responsive ON-OFF control. For purposes of this example, we will assume that the system uses the circuitry shown in FIG. 3. For the illustrated process example, we will assume that the system is initially in an OFF-state in which it does not emit any visible light (S1). However, the system is connected to power so that the microcontroller 129 is operative, and in this state, the microcontroller 129 controls the LED driver 128 for the IR emitter 118 to drive that emitter 118 to emit IR light energy into at least a portion of the area or region that is to be illuminated by the virtual source output light of the system.

In this example, the microcontroller 129 also receives and processes a sensing signal from the IR sensor 149. In an example such as that of FIG. 2, IR light from the emitter would illuminate at least a portion of the area or region that is to be illuminated by the virtual source output light of the system, and IR light reflected from the portion of the area would enter the optical integrating cavity through the aperture. In turn, the sensor 149 would receive reflected IR light that has been diffusely processed within the cavity. In response to the received IR light, the IR sensor 149 provides a signal to the microcontroller 129. The sensing signal represents a measure of an amount of the IR light received by the sensor 149, e.g. its magnitude or intensity. In this manner, the system implements an IR detection step at S2 in FIG. 4.

Figure 5A:
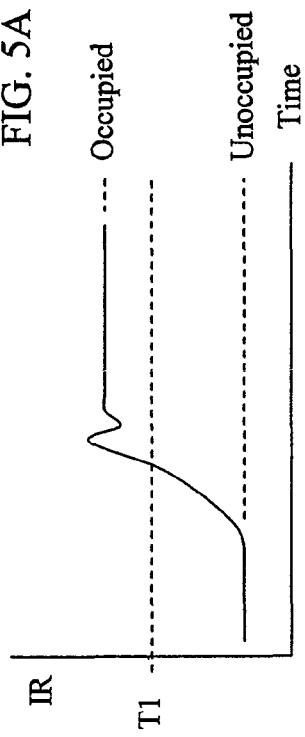
FIGS. 5A and 5B are simplified signal diagrams illustrating IR light levels and associated thresholds, useful in understanding an example of operation in accord with the process flow of FIG. 4.
Figure 5B:
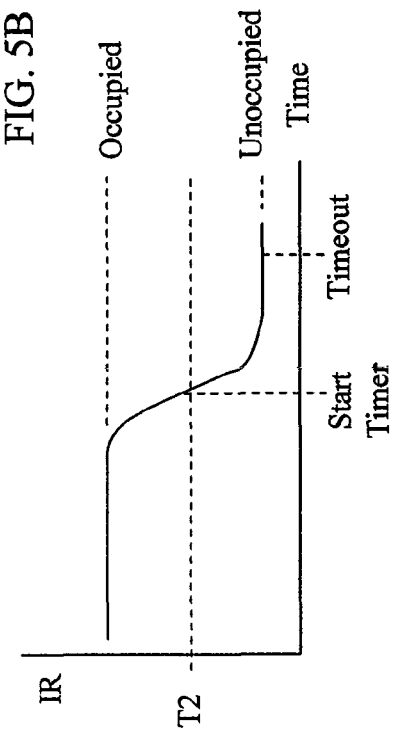

FIGS. 5A and 5B show simplified graphs of different states of the reflected IR light levels indicated by the sensing signal from the sensor 149. As shown in these graphs, at times when the area or region that is to be illuminated by the virtual source output light of the system is unoccupied, the amount of reflected IR light will be at a low ambient level.

Based on the IR detection at S2, the microcontroller 129 determines a relationship of the currently detected level of IR light detected by the sensor 149 to a first threshold T1 that microcontroller 129 uses as a reference indicating a predetermined change, e.g. to an occupied state. FIG. 5A shows an example of the threshold T1 in relation to typical levels of reflected IR that might be detected in the unoccupied state and the occupied state. At step S3 in the process flow of FIG. 4, if the signal from the IR sensor 149 indicates that the level of detected reflected IR is below the first threshold T1, then the process flow returns to the S1, where the microcontroller 129 keeps the system in its OFF-State. In this way, the process will loop through the detection and threshold comparison steps S1 to S3 as long as the IR level remains below the first threshold T1 and will keep the system in its OFF-state.

When a person enters the area to be illuminated by the system, the person will cause an increase in the amount of IR light reflected toward the light fixture. As a result, the amount of IR light sensed or detected by the IR sensor 149 will increase. At step S3 in the process flow of FIG. 4, when the signal from the IR sensor 149 indicates that the level of detected reflected IR has reached or exceeded (greater than or equal to) the first threshold T1, then the process flow branches to step S4. Essentially, the initial detection that the IR level has reached or exceeded the threshold represents a detection of a change in that signal of a type that corresponds to a change from an unoccupied state to an occupied state, upon entry of one or more people into the area to be illuminated by the system.

Although the microcontroller 129 could implement other control functions, if desired, in this example, when the processing branches to step S4, the microcontroller 129 transitions system operation to its ON-state. In the circuitry of FIG. 3, for example, the microcontroller 129 activates the drivers 121-127 to turn-ON the LEDs of the array 111, so that the array 111 emits light. The microcontroller 129 will control the amounts of light contributed by each of the groups of LEDs 113, 115, 117 and 119 in the manner discussed above, and the optical integrating cavity will diffusely process the light from the LEDs 113, 115, 117 and 119 of the array 111 to produce a virtual source output of combined light, as discussed above relative to FIGS. 1A to 3.

While in the ON-state, the microcontroller 129 continues to control the LED driver 128 for the IR emitter 118 to drive that emitter 118 to emit IR light energy into at least a portion of the area or region that is to be illuminated by the virtual source output light of the system. The system therefore will detect reflected IR light from the illuminated area, at step S5. This detection provides a signal representing the amount of reflected IR light detected by the sensor 149 for processing by the microcontroller 129, essentially as in the OFF-state. However, while occupied, the amount of IR light will be at the higher level caused by reflection of 1R light by the person or persons occupying the area, as shown in FIGS. 5A and 5B.

When a person leaves the illuminated area, the amount of reflected IR light will decrease, and that decrease will be indicated by the sensing signal from the sensor 149. When the last person leaves, the reflected IR level will transition from a relatively high state back down to a relatively low ambient level. The system can further control light operations in response to detection of such a transition. Hence, in the process flow of FIG. 4, at step S6, the microcontroller 129 compares the level of reflected IR represented by the detection signal from the IR sensor 149 to a second threshold T2. The second threshold T2 is a reference used to indicate a predetermined change, e.g. to an unoccupied state. FIG. 5B shows an example of the threshold T2 in relation to typical levels of reflected IR that might be detected in the occupied state and the unoccupied state.

At step S6 in the process flow of FIG. 4, if the signal from the IR sensor 149 indicates that the level of detected reflected IR is at or above (greater than or equal to) the second threshold T2, then the process flow returns to the S4, where the microcontroller 129 keeps the system in its ON-State. In this way, the process will loop through the detection and threshold comparison steps S4 to S6 as long as the IR level does not fall below the second threshold T2 and will keep the system in its light emitting ON-state.

At step S6 in the process flow of FIG. 4, when the signal from the IR sensor 149 indicates that the level of detected reflected IR has dropped below (less than) the second threshold T2, then the process flow branches to step S7. Essentially, the initial detection that the IR level has fallen below the threshold represents a detection of a change in that signal of a type that represents a change from an occupied state to an unoccupied state.

The microcontroller 129 could turn the system OFF at this point. However, as people often enter and exit areas for short times, it is often desirable to leave the light ON for some interval while unoccupied, to avoid an excessive number of transitions that some people might find annoying. Hence, when the process flow detects the transition to the unoccupied state, the step at S7 starts a timer (see also FIG. 5B). The timer function may be implemented in any known manner, for example, so as to count down from a starting value or so as to count up to a maximum value based on a system clock generated or used by the microcontroller 129. The timer could be a physical device but typically would be implemented as a programmed function of the microcontroller 129.

At step S8, the microcontroller 129 again compares the IR level to the second threshold T2. If the IR level has returned to or exceeded the second threshold (greater than or equal to), then it is assumed that the area has been re-occupied, and processing flows back to the ON-state in step S4.

However, if the IR level as indicated by the sensor signal from IR sensor 149 is below the second threshold T2, i.e. indicating that the illuminated area is unoccupied, then the microcontroller 129 checks the state of the timer at step S9. If the timer has not yet timed out, then processing returns to step S8. In this way, the processing loops through steps S8 and S9 until the IR level rises again (the area again becomes occupied) or until the timer times out. If the IR level as indicated by the sensor signal from IR sensor 149 remains below the second threshold T2 long enough for the timer to time out, then processing branches from step S9 to step S1, at which the microcontroller 129 turns OFF the system. Hence, when the area has been unoccupied for some measurable period, the microcontroller 129 will control the drivers 121-127 to reduce the power supplied to the LEDs 113, 115, 117 and 119 of the array 111, so that the array 111 no longer emits light, and of course, so that the system consumes substantially less power.

In the preceding example, the microcontroller 129 implemented two thresholds, T1 and T2 in relation to transitions between occupied and unoccupied states of the area illuminated by the system. Those skilled in the art will recognize that a single threshold may be used for both transitions. Also, for more complex control algorithms, it may be useful to apply a larger number of thresholds, e.g. to detect different levels of occupancy (e.g. different numbers of people occupying the area).

The above discussion of FIGS. 3 to 5B related to programmed digital implementations of the control logic. Those skilled in the art will recognize that the control also may be implemented using discrete logic components and/or analog circuitry.

Figure 6:
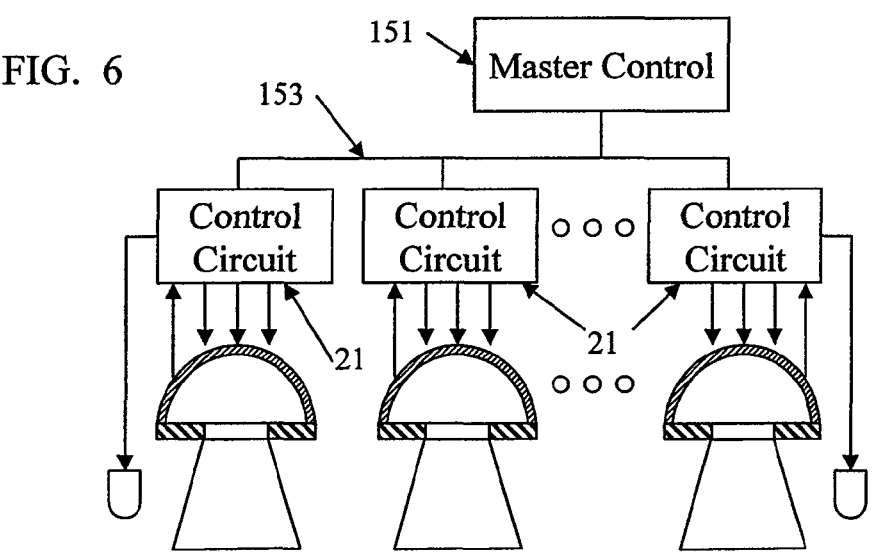
FIG. 6 is a diagram, illustrating a number of radiant energy emitting systems with common control from a master control unit.

The systems described above have a wide range of applications, where there is a desire to set or adjust color and/or intensity provided by a lighting fixture. These include task lighting and other general lighting applications, signal light applications, signage, as well as applications for illuminating an object or person. Some lighting applications involve a common overall control strategy for a number of the systems. As noted in the discussion of FIG. 3, the control circuitry may include a communication interface 139 or 141 allowing the microcontroller 129 to communicate with another processing system. FIG. 6 illustrates an example in which control circuits 21 of a number of the radiant energy generation systems with the light integrating and distribution type fixture communicate with a master control unit 151 via a communication network 153. The master control unit 151 typically is a programmable computer with an appropriate user interface, such as a personal computer or the like. The communication network 153 may be a LAN or a wide area network, of any desired type. The communications allow an operator to control the color and output intensity of all of the linked systems, for example to provide combined lighting effects. The commonly controlled lighting systems may be arranged in a variety of different ways, depending on the intended use of the systems.

The sensing of wavelengths of energy outsides those normally produced by the solid state light emitters for the illumination operations allows the individual fixtures to perform a number of other intelligent functions for communication purposes, automation and control of the lighting equipment and/or other systems, monitoring, or the like. For example, the network 153 may provide two-way data to and from the systems 21. In turn, the systems 21 could use light emissions and transmissions on selected wavelengths (e.g. near and far IR) to provide wireless transport of data to devices within the area illuminated by the systems. Alternatively, the detection might allow the systems to receive control data, to directly control operations or for relay over the network 153 to the master controller 151.

In an application for large area lighting with occupancy control, each of the systems in FIG. 6 might implement IR emission, sensing and processing as discussed above to detect transitions in occupancy state. A system control circuit 21 detecting a change to an occupied state might turn its light ON and transmit a notification message, to the master control 151 or directly to the other control circuits 21 to turn the other lighting systems ON. Based on exchanges of information between the systems and/or the master controller, all the systems might turn OFF when all of the systems no longer detect occupancy for some period of time. Of course, those skilled in the art will recognize that the communications between the intelligent lighting systems and/or with the master controller may implement a variety of other occupancy related control procedures.

The present teachings may utilize a variety of different fixture configurations, e.g. using different arrangements of the optical integrating cavity and/or solid state emitters. Such different configurations may also incorporate the detector(s) for sensing the other wavelengths in different ways. Hence, it may be helpful to consider some alternative configurations in somewhat more detail.

Figure 7:
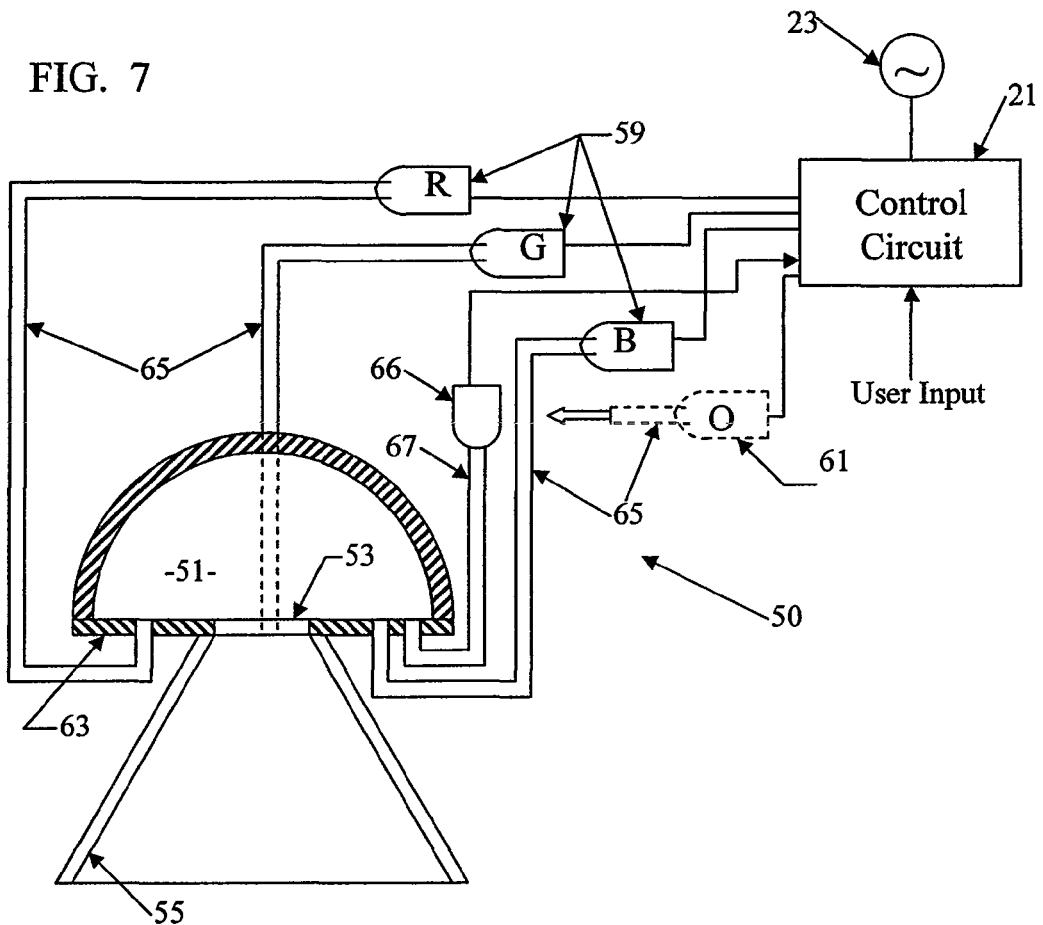
FIG. 7 illustrates another example of an intelligent light emitting system, using fiber optic links from the LEDs to the optical integrating cavity.

In the examples discussed above relative to FIGS. 1A to 2, the LED sources were coupled directly to openings at the points on the interior of the cavity, to emit radiant energy directly into the interior of the optical integrating cavity. It is also envisioned that the sources may be somewhat separated from the cavity, in which case, the system might include optical fibers or other forms of light guides coupled between the sources and the optical integrating cavity, to supply radiant energy from the sources to the emission points into the interior of the cavity. FIG. 7 depicts such a system 50, which uses optical fibers.

The system 50 includes an optical integrating cavity 51, an aperture 53 and a deflector with a reflective interior surface 55, similar to those in earlier embodiments. At least a portion of the interior surface of the optical integrating cavity 51 is highly diffusely reflective, whereas the deflector surface 55 exhibits a specular reflectivity. Integration or combination of light by diffuse reflection within the cavity 51 produces a virtual source output of relatively uniform unpixelated light via the aperture 53. Typically, the distribution at the aperture 53 is substantially Lambertian, and the integration produces a highly uniform light distribution across the aperture 53, which forms the virtual source output area of the cavity 51 and often forms all or a substantial part of the output area of the fixture. Typically, the unpixelated distribution of light across the aperture 53 exhibits a maximum-to-minimum ratio of 2 to 1 (2:1) or less over substantially the entire optical output area.

The system 50 includes a control circuit 21 and power source 23, as in earlier embodiments. In the system 50, the radiant energy sources comprise LEDs 59 of three different wavelengths, e.g. to provide Red, Green and Blue light respectively. The sources may also include one or more additional LEDs 61, either white or of a different color or for use as 'sleepers,' as discussed later. In this example (FIG. 7), the cover plate 63 of the cavity 51 has openings into which are fitted the light emitting distal ends of optical fibers 65. The proximal light receiving ends of the fibers 65 are coupled to receive light emitted by the LEDs 59 (and 61 if provided). In this way, the LED sources 59, 61 may be separate from the chamber 51, for example, to allow easier and more effective dissipation of heat from the LEDs. The fibers 65 transport the light from the LED sources 59, 61 to the cavity 51. The cavity 51 integrates the different colors of light from the LEDs as in the earlier examples and supplies combined light out through the aperture 53. The deflector, in turn, directs the combined light to a desired field. Again, the intensity control by the circuit 21 adjusts the amount or intensity of the light of each type provided by the LED sources and thus controls the spectral characteristic of the combined light output.

The virtual source output light has a spectral characteristic, typically in the visible light region of the spectrum, produced by the diffuse processing and combination of visible light of the color or colors produced by the solid state light sources 59, 61. The system may include an additional emitter, to produce light of a different color or wavelength, as in several of the earlier examples; although in the example of FIG. 7, an additional source is omitted for simplicity. Hence, the system will use passive detection, with regard to electromagnetic energy of the other color or wavelength absent from the light generated for illumination purposes. To that end, the system 50 includes a detector 66, for sensing at least one wavelength of electromagnetic energy that is absent from the light produced by the solid state light sources 59, 61 and/or absent from the combined light produced in the chamber 51 and output via the aperture 53 and deflector 55.

In the example, the intent is for the detector 66 to sense a characteristic of electromagnetic energy reflected within the cavity 51. The detector could be coupled directly to the cavity, as in several of the earlier examples. However, in this example, the system includes another optical fiber 67 to couple electromagnetic energy from the cavity 51 to the detector 66.

The receiving end of the fiber 67 may be coupled to any convenient point on a wall or within the volume of the optical integrating cavity 51. In this example (FIG. 7), the cover plate 63 of the cavity 51 has an additional opening into which is fitted the light receiving end of optical fiber 67. The light emitting end of the fiber 67 is coupled to supply the received light to the detector 66. In this way, the fiber 67 transports the light from the cavity 51 to the detector 66.

Since the detector 66 senses a wavelength not present in the spectrum of light generated in the cavity 51 by the sources 59, 61, the detector 66 is responsive to energy of that wavelength that enters the cavity 51 via the aperture 53 and reflects off the surface(s) of the cavity 51 and is transported through the fiber 67. In response, the detector 66 supplies a detection signal to the control circuit 21, for processing in any of the various ways suggested above.

Figure 8:
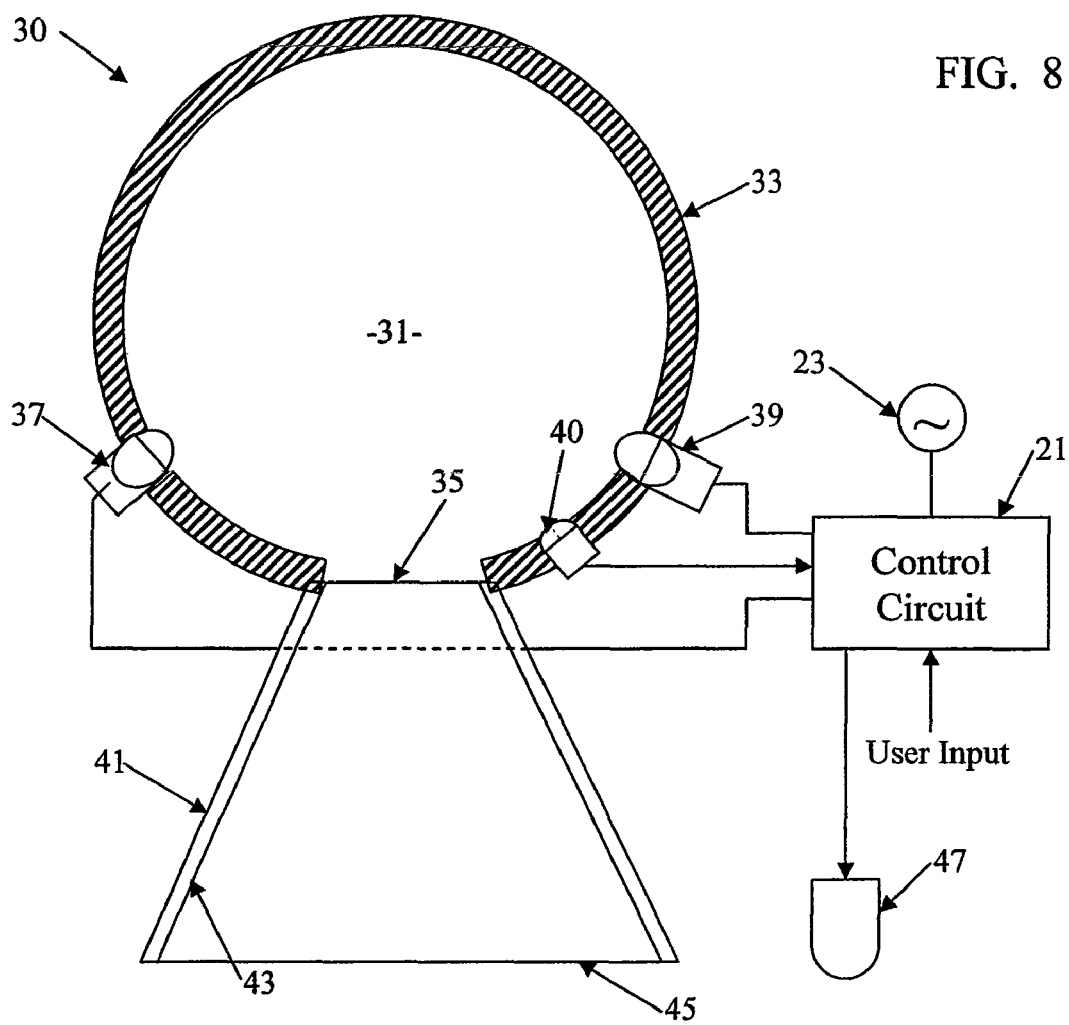
FIG. 8 illustrates another example of an intelligent light emitting system, with certain elements thereof shown in cross-section.
Figure 9:
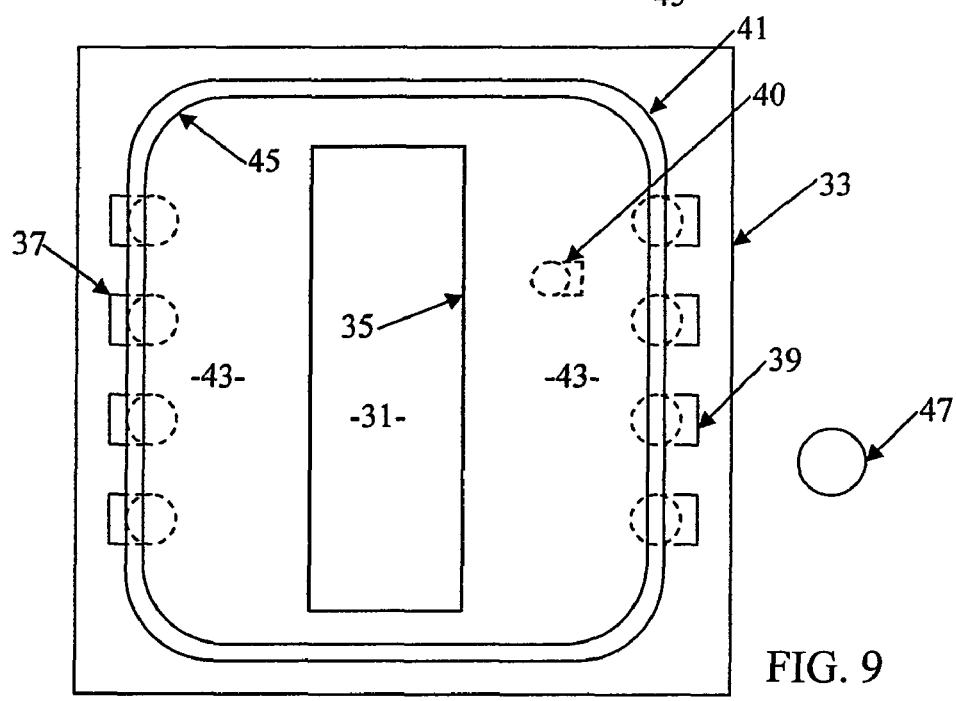
FIG. 9 is a bottom view of the fixture in the system of FIG. 8.

FIGS. 8 and 9 illustrate another example of a radiant energy distribution apparatus or system with sensing of at least one additional wavelength to support system intelligence. FIG. 8 shows the overall system 30, including the fixture and the control circuitry; and that drawing shows the fixture is in cross-section. FIG. 9 is a bottom view of the fixture. The system 30 is generally similar the system 10 of FIG. 2. For example, the system 30 may utilize essentially the same type of control circuit 21 and power source 23, as in the earlier example. However, the shape of the optical integrating cavity and the deflector are somewhat different.

The optical integrating cavity 31 has a diffusely reflective interior surface. In this example, the cavity 31 has a shape corresponding to a substantial portion of a cylinder. In the cross-sectional view of FIG. 8 (taken across the longitudinal axis of the cavity), the cavity 31 appears to have an almost circular shape. Although a dome and curved member or plate could be used, in this example, the cavity 31 is formed by a substantially cylindrical element 33. At least the interior surface of the element 33 is highly diffusely reflective, so that the resulting optical cavity 31 is highly diffusely reflective and functions as an integrating cavity, with respect to the radiant energy spectrum produced by and processed in the system 30.

The optical integrating cavity 31 has an aperture 35 for allowing emission of combined radiant energy in the form of a virtual source. In this example, the aperture 35 is a rectangular passage through the wall of the cylindrical element 33. Because of the diffuse reflectivity within the cavity 31, light within the cavity is integrated before passage out of the aperture 35. As in the earlier examples, the combination of light within the cavity 31 produces a relatively uniform intensity distribution across the output area formed by the aperture 35. Typically, the distribution is substantially Lambertian and the integration produces a highly uniform light distribution across the aperture 17, which forms the virtual source output of the cavity 11 and often forms all or a substantial part of the output area of the fixture. Typically, the unpixelated distribution of light across the aperture 17 exhibits a maximum-to-minimum ratio of 2 to 1 (2:1) or less over substantially the entire optical output area.

The apparatus 30 also includes solid state sources of radiant energy of different wavelengths. In this example, the sources comprise LEDs 37, 39. The LEDs are mounted openings through the wall of the cylindrical element 33, to essentially form two rows of LEDs on opposite sides of the aperture 35. The positions of these openings, and thus the positions of the LEDs 37 and 39, typically are such that the LED outputs are not directly visible through the aperture 35. Hence, light from these LEDs reflects and diffuses within the cavity before emission through the optical aperture, otherwise the locations are a matter of arbitrary choice.

Thus, the LEDs 37 and 39 supply radiant energy into the interior of the optical integrating cavity 31, through openings at points on the interior surface of the optical integrating cavity not directly visible through the aperture 35. A number of the LEDs emit radiant energy of different wavelengths. For example, arbitrary pairs of the LEDs 37, 39 might emit four different colors of light, e.g. Red, Green and Blue as primary colors and a fourth color chosen to provide an increased variability of the spectral characteristic of the integrated radiant energy. One or more white light sources, e.g. white LEDs, also may be provided.

Alternatively, a number of the LEDs may be initially active LEDs, whereas others are initially inactive sleeper LEDs. The sleeper LEDs offer a redundant capacity that can be automatically activated on an as-needed basis. For example, the initially active LEDs might include two Red LEDs, two Green LEDs and a Blue LED; and the sleeper LEDs might include one Red LED, one Green LED and one Blue LED.

The control circuit 21 controls the power provided to each of the LEDs 37 and 39. The cavity 31 effectively combines the energy of different wavelengths, from the various LEDs 37 and 39, so that the integrated radiant energy emitted through the aperture 35 includes the radiant energy of all the various wavelengths. Control of the amount of light emission of the sources, by the control circuit 21, sets a spectral characteristic of the combined radiant energy emitted through the aperture 35. If sleeper LEDs are provided, the control also activates one or more dormant LEDs, on an "as-needed" basis, when extra output of a particular wavelength or color is required.

The exemplary system 30 also includes a sensor or detector 40 for detecting an amount (e.g. intensity) of electromagnetic energy of a wavelength that is absent from the light produced by the LEDS 37, 39 and the diffuse processing of the light from the LEDs within the cavity 31. In this example, the LEDs 37, 39 produce visible light, and the combined light produced by diffuse reflection of the light from the LEDs within the cavity 31 is visible light. It is intended that adjustment of the amounts of light from the LEDs 37, 39 will enable selection of the spectral characteristic of the visible light output of the system over a substantial range of the visible light portion of the electromagnetic spectrum. Hence, the detector 40 is of a type or configuration for sensing at least one wavelength outside of the visible light portion of the electromagnetic spectrum. Although the detector 40 might sense UV light or other non-visible wavelengths, in the example of system 30, the detector 40 senses IR light energy in the near IR range or in the far IR range. The detector 40 supplies a sensing signal to the control circuit 21, as in the earlier examples.

The color integrating energy distribution apparatus 30 may also include a deflector 41 having a specular reflective inner surface 43, to efficiently direct most of the light emerging from the aperture into a relatively narrow field of view. The deflector 41 expands outward from a small end thereof coupled to the aperture 35. The deflector 41 has a larger opening 45 at a distal end thereof. The angle of the side walls of the deflector and the shape of the distal opening 45 of the deflector 41 define an angular field of radiant energy emission from the apparatus 30 as well as the angular field of view for IR sensing purposes.

As noted above, the deflector 41 may have a variety of different shapes, depending on the particular lighting application. In the example, where the cavity 31 is substantially cylindrical, and the aperture is rectangular, the cross-section of the deflector 41 (viewed across the longitudinal axis as in FIG. 8) typically appears conical, since the deflector expands outward as it extends away from the aperture 35. However, when viewed on-end (bottom view—FIG. 9), the openings are substantially rectangular, although they may have somewhat rounded corners. Alternatively, the deflector 41 may be somewhat oval in shape. The shapes of the cavity and the aperture may vary, for example, to have rounded ends, and the deflector may be contoured to match the aperture.

The deflector 41 comprises a reflective interior surface 43 between the distal end and the proximal end. In several examples, at least a substantial portion of the reflective interior surface 43 of the conical deflector exhibits specular reflectivity with respect to the combined radiant energy, although different reflectivity may be provided, as noted in the discussion of FIG. 2.

If redundancy is provided, "sleeper" LEDs would be activated only when needed to maintain the light output, color, color temperature, and/or thermal temperature. As discussed earlier with regard to the exemplary control circuit of FIG. 3, the system 30 could have a color feedback sensor coupled to provide feedback to the control circuit 21. The feedback sensor could be within the cavity or the deflector or at an outside point illuminated by the integrated light from the fixture. As LEDs age, they continue to operate, but at a reduced output level. The use of the sleeper LEDs greatly extends the lifecycle of the fixtures. Activating a sleeper (previously inactive) LED, for example, provides compensation for the decrease in output of the originally active LED. There is also more flexibility in the range of intensities that the fixtures may provide.

The system 30 also includes a source 47 of IR light, that is to say of at least one wavelength absent from the light produced by the LEDs 37, 39 and the combined light output emitted through the aperture 35. The source 47 may emit light of a different wavelength from that sensed by the detector 40, but in this example, the IR source 47 emits light of a wavelength that the detector 40 will sense. The IR source 47 may be mounted on or near the fixture but outside the deflector 41 as shown, or the IR source 47 may be mounted at a different location. IR light from the source 47 illuminates at least a portion of a region intended to be illuminated by the combined light output from the aperture 35.

The reflected IR light, e.g. from a person that enters the region, enters the cavity 31 via the deflector 41 and the aperture 35. The IR light reflects and diffuses within the cavity 31, and at least some of that light impacts on the detector 40. Upon receiving the IR light via the cavity 31, the detector 40 generates a responsive sensing signal and supplies that signal to the control circuit 21 for further processing. In this way, the detector 40 and the source 47 provide a detection input, for example, for use in occupancy detection as discussed above relative to FIG. 4, although the source and detector could be used in other ways as also suggested earlier.

In the examples above, a deflector was used to provide further optical processing of the integrated light emerging from the aperture of the fixture, and in some cases for processing detectable electromagnetic energy before entry into the chamber and sensing by the detector. A variety of other optical processing devices may be used in place of or in combination with a deflector or other optical processing element(s). Examples include various types of diffusers, collimators, variable focus mechanisms, and iris or aperture size control mechanisms. Several of these examples are shown in FIGS. 10A to 10C.

Figure 10A:
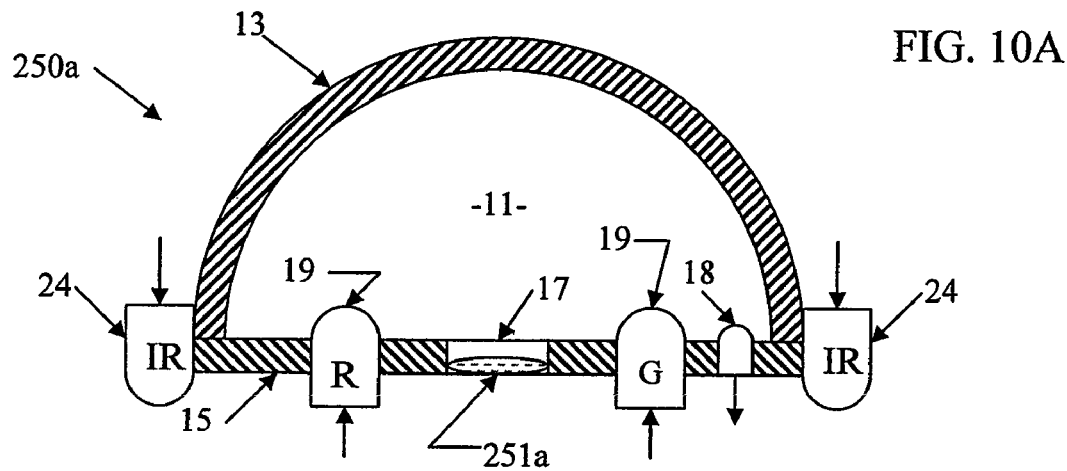
FIGS. 10A to 10C are cross-sectional views of additional examples, of optical cavity LED light fixtures, with several alternative elements for processing of the combined light emerging from the cavity.
Figure 10B:
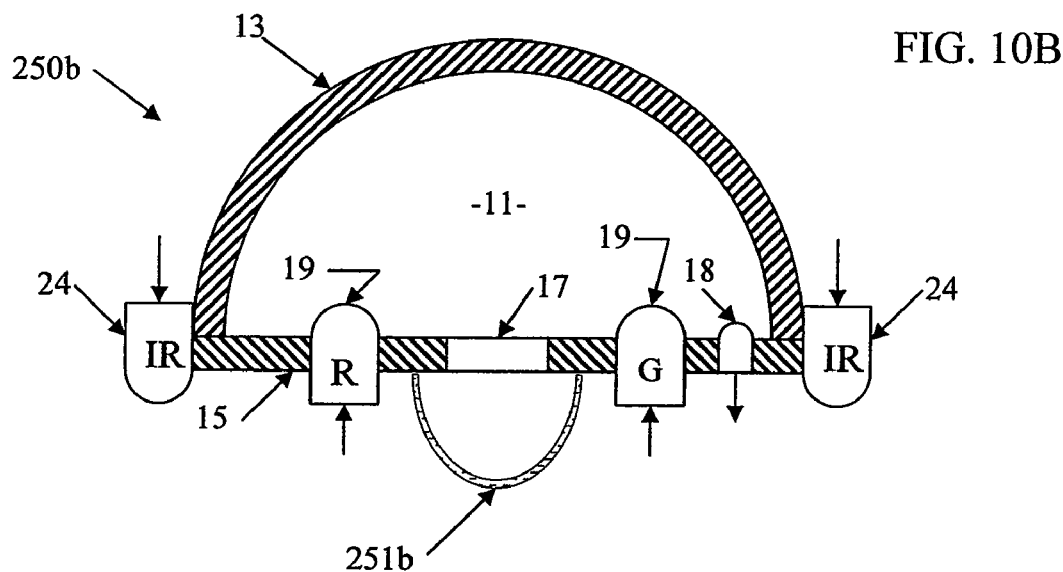
Figure 10C:
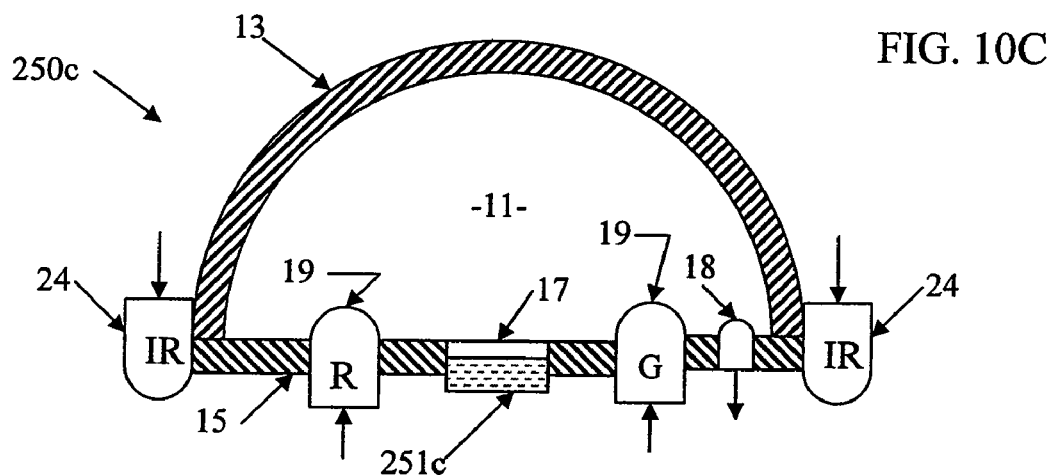

FIGS. 10A to 10C are cross-sectional views of several examples of optical cavity LED fixtures using various forms of secondary optical processing elements to process the integrated energy emitted through the aperture. Although similar fixtures may process and emit other radiant energy spectra, for discussion here we will assume these "lighting" fixtures process and emit light in the visible part of the spectrum. These first three examples are similar to each other, and the common aspects are described first. Each fixture 250 (250a to 250c in FIGS. 10A to 10C, respectively) includes an optical integrating cavity 11 and LEDs 19 similar to those in the example of FIG. 2 and like reference numerals are used to identify the corresponding components. Integration or combination of light by diffuse reflection within the cavity 11 produces a relatively uniform unpixelated virtual source output via the aperture 17. Typically, the distribution at the aperture 17 is substantially Lambertian, and the integration produces a highly uniform light distribution across the aperture, which forms the output area of the cavity and often forms all or a substantial part of the output area of the fixture. Typically, the unpixelated distribution of light across the aperture 17 exhibits a maximum-to-minimum ratio of 2 to 1 (2:1) or less over substantially the entire optical output area. Each fixture also includes a detector 18, in this instance for detection of IR energy, and each system includes at least two IR sources, shown attached to or in close proximity to the portion of the fixture forming the cavity. A power source and control circuit similar to those used in the earlier example of FIG. 2 provide the drive currents for the LEDs, and in view of the similarity, the power source and control circuit are omitted from these figures, to simplify the illustrations.

In the examples of FIGS. 10A to 10C, each light fixture 250a to 250c includes an optical integrating cavity 11, formed by a dome 11 and a cover plate 15. The surfaces of the dome 13 and cover 15 forming the interior surface(s) of the cavity 11 are diffusely reflective. One or more apertures 17, in these examples formed through the plate 15, provide a light passage for transmission of reflected and integrated light outward from the cavity 11. Materials, positions, orientations and possible shapes for the elements 11 to 17 and the resulting combined and unpixelated light provided at the aperture 17 have been discussed above.

As in the earlier examples, each fixture 250a to 250c includes a number of LEDs 19 emitting light of different wavelengths into the cavity 11, as in the example of FIG. 2. A number of the LEDs will be active, from initial start-up, whereas others may initially be inactive 'sleepers,' as also discussed above. The possible combinations and positions of the LEDs 19 have been discussed in detail above, in relation to the earlier examples. Again, the LEDs 19 emit light of multiple colors into the interior of the optical integrating cavity. Control of the amplitudes of the drive currents applied to the LEDs 19 controls the amount of each light color supplied into the cavity 11. The cavity 11 integrates the various amounts of light of the different colors into a combined light for emission through the aperture 17.

The LEDs 19 produce visible light, and the combination by processing of the light from the LEDs by reflection within the cavity 11 produces a combined light in the visible portion of the spectrum. In each of these examples, each of the systems 250a to 250c includes a detector 18 for detecting at least one wavelength of electromagnetic energy that is absent from the light generated by the LEDs 19 and/or by the combination of such light within the cavity 11. Although the wavelength detected could be in the visible portion or the UV portion of the spectrum, in the examples of FIGS. 10A to 10C, the detector 18 is an IR detector.

Each of the systems 250a to 250c includes at least one source for emitting electromagnetic energy of at least one wavelength that is absent from the light generated by the LEDs 19 and/or by the combination of such light within the cavity 11. The detector 18 is coupled to receive IR light from within the cavity 11. In these examples, the additional sources take the form of IR, emitting LEDs 24 that are mounted/coupled so as to emit IR light outside the cavity 11, that is to say to illuminate an area with the IR light without first passing the IR light from the sources 24 through the cavity 11 and the aperture 17. The IR light from the sources 24 may emit IR light of the same wavelength as sensed by the detector 18, for example, for occupancy detection applications or the like. It also possible that the sources 24 will emit IR light of a different wavelength, e.g. in the near or far IR range whereas the detector 18 detects far or near IR light respectively. Control of the operation of the IR sources 24 and processing of the sensing signal from the detector 18 typically are the same as discussed above with regard to the examples of FIG. 2 and FIG. 3.

The three examples (FIGS. 10A to 10C) differ as to the processing element coupled to the aperture that processes the integrated color light output coming out of the optical aperture 17. Of course, IR light coming to the fixture to enter the cavity 11 through the aperture 17 will also pass through the respective processing element. In the example of FIG. 10A, instead of a deflector as in FIG. 2, the fixture 250a includes a lens 251a in or covering the opening forming the transmissive optical aperture 17. The lens may take any convenient form, for focusing or diffusing the emitted combined light, and/or diffusing or focusing the incoming IR light, as desired for a particular application of the fixture 250*a*. The lens 251*a* may be clear or translucent.

In the example of FIG. 10B, the fixture 250*b* includes a curved transmissive diffuser 251*a* covering the aperture 17. The diffuser may take any convenient form, for example, a white or clear dome of plastic or glass. Alternatively, the diffuser 251*b* may be formed of a prismatic material. In addition to covering the aperture, the element 251*b* diffuses the emitted combined light, as desired for a particular application of the fixture 250*b*. The dome shaped diffuser may cover just the aperture 17, as shown at 251*b*, or it may cover the backs of the LEDs 19 as well. Of course, the dome shaped diffuser 251*b* will also process incoming light, such as the IR light entering the cavity for detection by the detector 18.

In the example of FIG. 10C, a holographic diffraction plate or grading 251*c* serves as the optical output processing element in the fixture 250*c*. The holographic grating is another form of diffuser. The holographic diffuser 251*c* is located in the opening forming optical aperture 17 or attached to the plate 15 to cover the aperture 17. A holographic diffuser provides more precise control over the diffuse area of illumination and increases transmission efficiency. Holographic diffusers and/or holographic films are available from a number of manufacturers, including Edmund Industrial Optics of Barrington, N.J. Of course, the holographic diffuser 251*c* will also process incoming light, such as the IR light entering the cavity for detection by the detector 18.

Those skilled in the art will recognize that still other light processing elements may be used in place of the output lens 251*a*, the diffuser 251*b* and the holographic diffuser 251*c*, to process or guide the integrated light output. For example, a fiber optic bundle may be used to channel the output light to a desired point, for example representing a pixel on a large display screen (e.g. a jumbotron). Such a further processing element would also process incoming light, before entry into the cavity for reflection and detection.

To provide a uniform output distribution from the apparatus, it is also possible to construct the optical cavity so as to provide constructive occlusion. Constructive Occlusion type transducer systems utilize an electrical/optical transducer optically coupled to an active area of the system, typically the aperture of a cavity or an effective aperture formed by a reflection of the cavity. The systems utilize diffusely reflective surfaces, such that the active area exhibits a substantially Lambertian characteristic. A mask occludes a portion of the active area of the system, in the examples, the aperture of the cavity or the effective aperture formed by the cavity reflection, in such a manner as to achieve a desired response or output performance characteristic for the system. In examples of the present systems using constructive occlusion, the optical integrating cavity comprises a base, a mask and a cavity in either the base or the mask. The mask would have a diffusely reflective surface facing toward the aperture. The mask is sized and positioned relative to the active area so as to constructively occlude the active area. As with the earlier optics, constructive occlusion applies to both outgoing and incoming light. Hence, constructive occlusion also tailors sensitivity of the detection function. It may be helpful to consider some examples using constructive occlusion.

Figure 11:
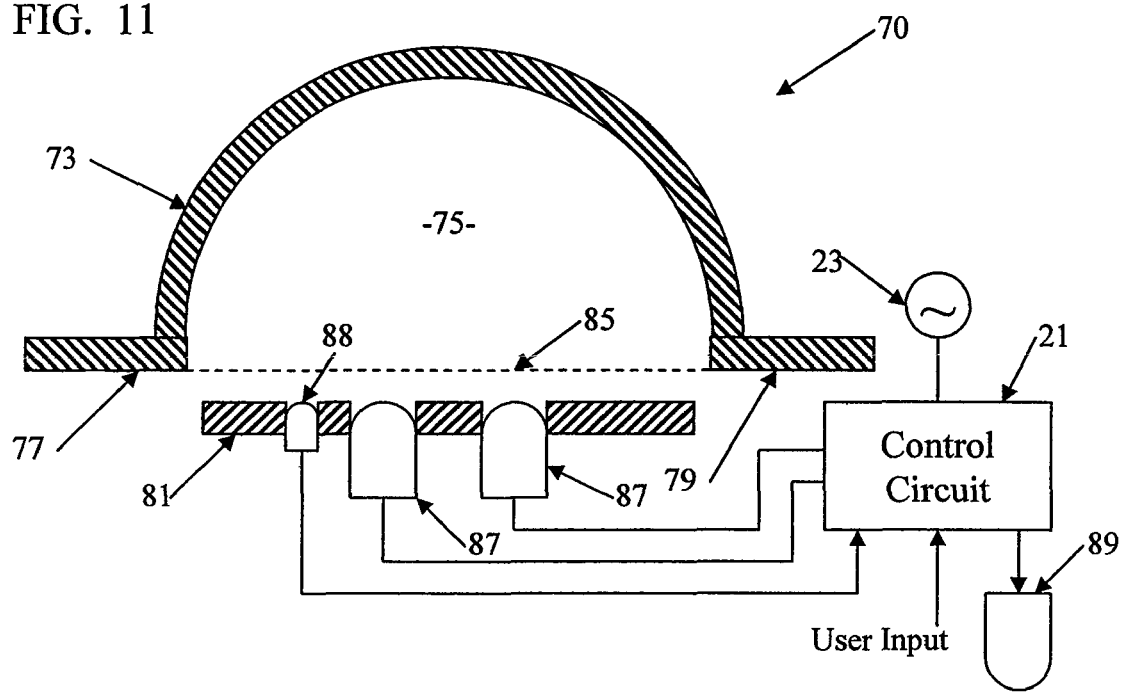
FIG. 11 illustrates another example of an intelligent light emitting system, utilizing principles of mask and cavity type constructive occlusion.
Figure 12:
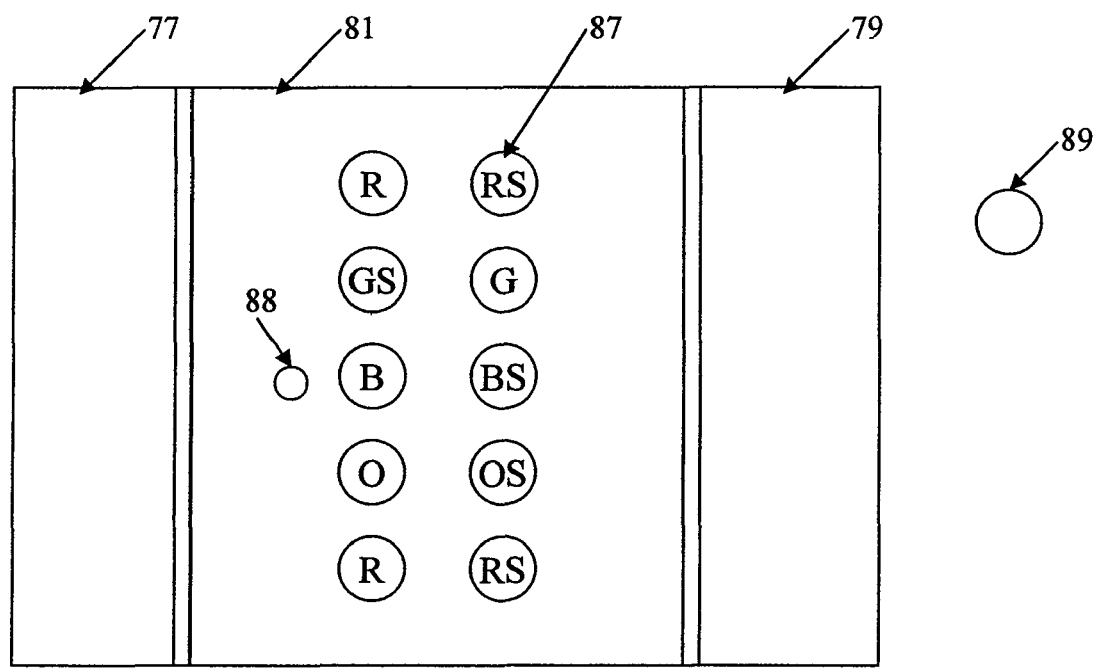
FIG. 12 is a bottom view of the fixture in the system of FIG. 10.

FIGS. 11 and 12 depict a first, simple embodiment of a light distributor apparatus or system 70, for projecting integrated multi-wavelength light with a tailored intensity distribution, using the principles of constructive occlusion. In the cross-section illustration, the system 70 is oriented to provide downward illumination. Such a system might be mounted in or suspended from a ceiling or canopy or the like. Those skilled in the art will recognize that the designer may choose to orient the system 70 in different directions, to adapt the system to other lighting applications.

The lighting system 70 includes a base 73, having or forming a cavity 75, and adjacent shoulders 77 and 79, constructed in a manner similar to the elements forming integrating cavities in the earlier examples. In particular, the interior of the cavity 75 is diffusely reflective, and the down-facing surfaces of shoulders 77 and 79 may be reflective. If the shoulder surfaces are reflective, they may be specular or diffusely reflective. A mask 81 is disposed between the cavity aperture 85 and the field to be illuminated. In this symmetrical embodiment, the interior wall of a half-cylindrical base 73 forms the cavity 75; therefore the aperture 85 is rectangular. The shoulders 77 formed along the sides of the aperture 85 are rectangular. If the base were circular, with a hemispherical cavity, the shoulders typically would form a ring that may partially or completely surround the aperture.

In many constructive occlusion embodiments, the cavity 75 comprises a substantial segment of a sphere. For example, the cavity may be substantially hemispherical, as in earlier examples. However, the cavity's shape is not of critical importance. A variety of other shapes may be used. In the illustrated example, the half-cylindrical cavity 75 has a rectangular aperture, and if extended longitudinally, the rectangular aperture may approach a nearly linear aperture (slit). Practically any cavity shape is effective, so long as it has a diffuse reflective inner surface. A hemisphere or the illustrated half-cylinder shape is preferred for the ease in modeling for the light output toward the field of intended illumination and the attendant ease of manufacture. Also, sharp corners tend to trap some reflected energy and reduce output efficiency.

For purposes of constructive occlusion, the base 73 may be considered to have an active optical area, preferably exhibiting a substantially Lambertian energy distribution. Where the cavity is formed in the base, for example, the planar aperture 85 formed by the rim or perimeter of the cavity 75 forms the active surface with substantially Lambertian distribution of energy emerging through the aperture 85. As shown in a later embodiment, the cavity 75 may be formed in the facing surface of the mask. In such a system, the surface of the base may be a diffusely reflective surface, therefore the active area on the base would essentially be the mirror image of the cavity aperture on the base surface, that is to say the area reflecting energy emerging from the physical aperture of the cavity in the mask.

The mask 81 constructively occludes a portion of the optically active area of the base with respect to the field of intended illumination. In the example of FIG. 11, the optically active area is the aperture 85 of the cavity 75; therefore the mask 81 occludes a substantial portion of the aperture 85, including the portion of the aperture on and about the axis of the mask and cavity system. The surface of the mask 81 facing towards the aperture 85 is reflective. Although it may be specular, typically this surface is diffusely reflective.

The relative dimensions of the mask 81 and aperture 85, for example the relative widths (or diameters or radii in a more circular system) as well as the separation distance of the mask 81 away from the aperture 85, control the constructive occlusion performance characteristics of the lighting system 70. Certain combinations of these parameters produce a relatively uniform emission intensity with respect to angles of emission, over a wide portion of the field of view about the system axis (vertically downward in FIG. 11), covered principally by the constructive occlusion. Other combinations of size and separation distance result in a system performance that is uniform with respect to a wide planar surface perpendicular to the system axis at a fixed distance from the active area.

The shoulders 77, 79 also are reflective and therefore deflect at least some light downward. The shoulders (and side surfaces of the mask) provide additional optical processing of combined light from the cavity. The angles of the shoulders and the reflectivity of the surfaces thereof facing toward the region to be illuminated by constructive occlusion also contribute to the intensity distribution over that region. In the illustrated example, the reflective shoulders are horizontal, although they may be angled somewhat downward from the plane of the aperture.

With respect to the energy from the solid state light emitting elements (e.g. LEDs 87), the interior space formed between the cavity 75 and the facing surface of the mask 81 operates as an optical integrating cavity, in essentially the same manner as the integrating cavities in the previous embodiments. The LEDs could provide light of one color, e.g. white. In the example, the LEDs 87 provide light of a number of different colors, and thus of different wavelengths. The optical cavity combines the light of multiple colors supplied from the LEDs 87. The control circuit 21 controls the amount of each color of light supplied to the chamber and thus the proportion thereof included in the combined output light. The constructive occlusion serves to distribute that light in a desired manner over a field or area that the system 70 is intended to illuminate, with a tailored intensity distribution.

The LEDs 87 could be located at (or coupled by optical fiber to emit light) from any location or part of the surface of the cavity 75. Preferably, the LED outputs are not directly visible through the un-occluded portions of the aperture 85 (between the mask and the edge of the cavity). The LED outputs diffusely reflect one or more times before combined light emission through the gap between the rim of the cavity (aperture edge) and the perimeter of the mask. In examples of the type shown in FIGS. 11 and 12, the easiest way to so position the LED outputs is to mount the LEDs 87 (or provide fibers or the like) so as to supply light to the chamber through openings through the mask 81.

FIG. 12 also provides an example of an arrangement of the LEDs in which there are both active and inactive (sleeper) LEDs of the various colors. As shown, the active part of the array of LEDs 87 includes two Red LEDs (R), one Green LED (G) and one Blue LED (B). The initially inactive part of the array of LEDs 87 includes two Red sleeper LEDs (RS), one Green sleeper LED (GS) and one Blue sleeper LED (BS). If other wavelengths or white light sources are desired, the apparatus may include an active LED of the other color (O) as well as a sleeper LED of the other color (OS). The precise number, type, arrangement and mounting technique of the LEDs and the associated ports through the mask 81 are not critical. The number of LEDs, for example, is chosen to provide a desired level of output energy (intensity), for a given application.

The system 70 includes a control circuit 21 and power source 23. These elements control the operation and output intensity of each LED 87. The individual intensities determine the amount of each color light included in the integrated and distributed output. The control circuit 21 functions in essentially the same manner as in the other examples.

The constructive occlusion provides a tailored intensity distribution with respect to light generated by the LEDs 87, diffusely reflected within the optical integrating cavity 75 and emitted around the gap between the aperture 85 and the edge of the mask 81. Reflective surfaces of the shoulders 77, 79 and of the mask also tend to distribute that combined/processed light output over the area or region to be illuminated by the system 70. The optical processing by these elements, however, also applies to incoming light from that region, for example, as might be sensed by a detector 88 coupled to the cavity 75. Although the detector may be coupled to receive reflected light from other points in or on the wall of the cavity, in the example, the detector 88 is located or otherwise coupled to receive light at a point on the mask 81. As in the earlier examples, the detector 88 is configured or of a type that detects a wavelength of electromagnetic energy that is absent from the light generated by the LEDs and/or by the processing of the light from the LEDs by the cavity and mask. The detector 88 provides a sensing signal to the control circuit 21, as discussed above.

The system 70 also includes a source 89 of electromagnetic energy of at least one wavelength that is absent from the light generated by the LEDs 87 and/or by the processing of the light from the LEDs by the cavity and mask. In this example, the source emits light outside the cavity and mask system. The control 21 controls operation of the source 89, in a manner similar to several of the earlier examples.

As noted, the optical processing in the fixture in the system 70 operates in both directions, to process light being emitted by the system (generated by the LEDs 87) and to process electromagnetic energy received by the system (for reception/sensing by the detector 88). In the outgoing direction, a substantially Lambertian emitting surface LS can be created using the point illuminating type LED elements 87 that illuminate the cavity 75 whose interior surface is diffusely reflective. The cavity 87 diffusely reflects light from the point sources such that a uniformly illuminated surface is created at the aperture 85 of the cavity 75. Correspondingly, a substantially Lambertian detection surface LS can be created using a point detecting element such as a photodiode or the light used for the detector 88, which detects light within the cavity 75. The cavity 75 diffusely reflects electromagnetic energy entering the cavity 75 through the aperture 85 such that the point detecting type detector element 88 detects electromagnetic energy uniformly with respect to the aperture 85.

The occlusion provided by the mask 81 tailors the sensitivity distribution of the system in much the same way that it tailors the output distribution of the system. Properly sized and positioned from the area of aperture 85, the mask 81 selectively blocks or occludes portions of the aperture area with respect to incoming light. The occlusion by the mask tends to reduce the dependency or sensitivity of the detection function to the angle of the incoming light. The reflective surfaces of the shoulders 77 and 79 and of the mask 81 may also help to direct incoming light through the aperture and thus further tailor the sensitivity of the system to detect incoming light. The emission and detection profiles can be substantially uniform for most angles, in accordance with the selected mask/cavity/aperture geometry. With the use of shoulder, the uniformity of emission distribution and uniformity of sensitivity to incoming light may extend out near the horizon of the fixture.

Hence, the combined light output of the system 70 is relatively uniformly distributed by operation of the mask and cavity type constructive occlusion. The incoming light, of the wavelength(s) to which the detector 88 is sensitive, is also processed by the optical elements of the system 70 so that the detection profile is relatively uniform over a wide range of angles of incidence of the incoming light.

Figure 14:
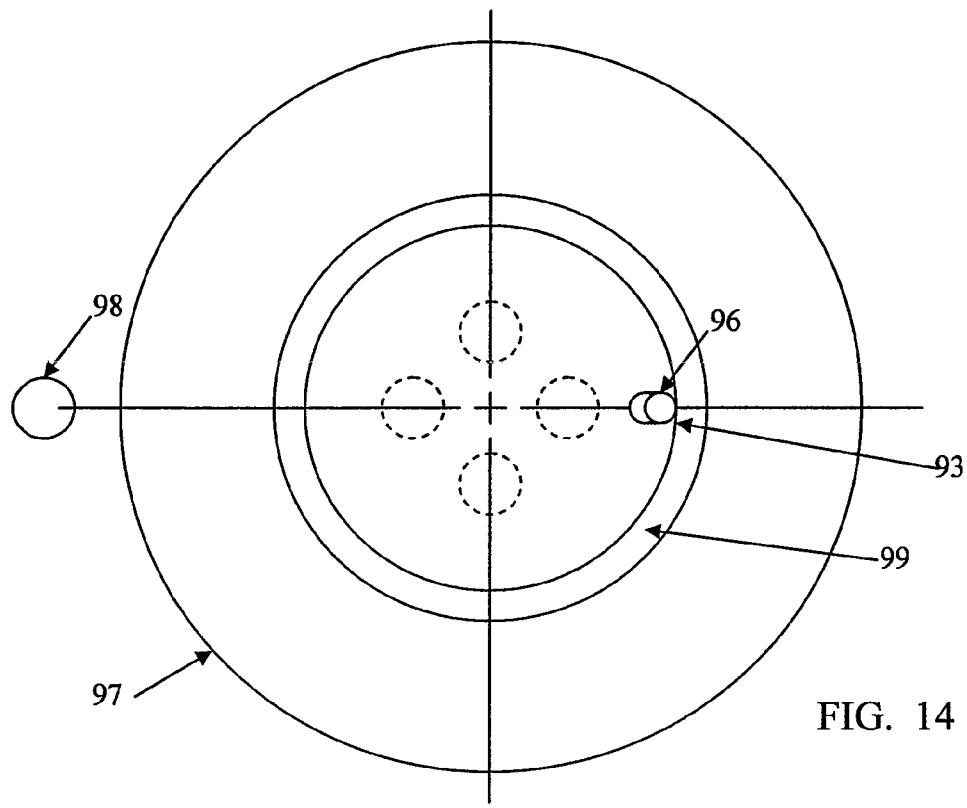
FIG. 14 is a top plan view of the fixture in the system of FIG. 12 and associated detectors.
Figure 13:
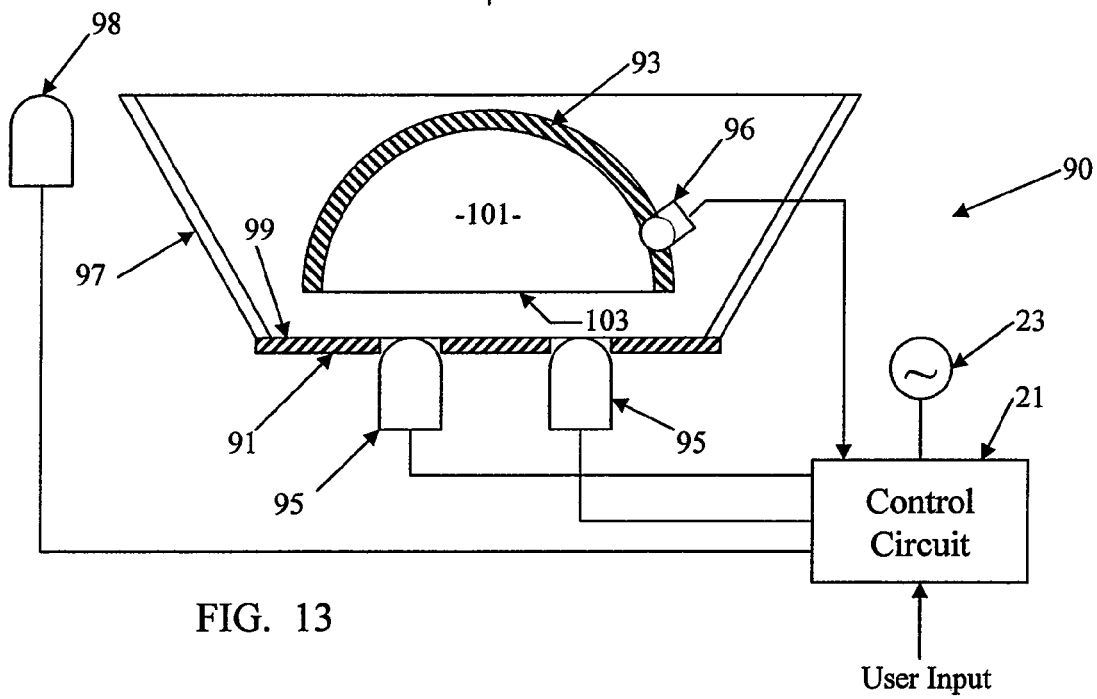
FIG. 13 illustrates an alternate example of an intelligent light emitting system, utilizing principles of constructive occlusion.

FIGS. 13 and 14 illustrate a second mask and cavity type constructive occlusion example. In this example, the physical cavity is actually formed in the mask, and the active area of the base is a flat reflective panel of the base.

The illustrated system 90 comprises a flat base panel 91, a mask 93, LED light sources 95, a detector 96 and a conical deflector 97. The system may also include a source 98. The detector 96 and source 98 are for detection and emission respectively of light or other electromagnetic energy of one or more wavelengths absent from the light emissions by the LEDs 95 for the illumination application, as in earlier examples.

The system 90 is circularly symmetrical about a vertical axis, although it could be rectangular or have other shapes. The base 91 includes a flat central region 99 between the walls of the deflector 97. The region 99 is reflective and forms or contains the active optical area on the base facing toward the region or area to be illuminated by the system 90.

The mask 93 is positioned between the base 91 and the region to be illuminated by constructive occlusion. For example, in the orientation shown, the mask 93 is above the active optical area 99 of the base 91, for example to direct light toward a ceiling for indirect illumination. Of course, the mask and cavity system could be inverted to serve as a downlight for task lighting applications, or the mask and cavity system could be oriented to emit light in directions appropriate for other applications.

In this example, the mask 93 contains the diffusely reflective cavity 101, constructed in a manner similar to the integrating cavities in the earlier examples. The physical aperture 103 of the cavity 101 and of any diffusely reflective surface(s) of the mask 93 that may surround that aperture form an active optical area on the mask 93. Such an active area on the mask faces away from the region to be illuminated and toward the active surface 99 on the base 91. The surface 99 is reflective, preferably with a diffuse characteristic. The surface 99 of the base 91 essentially acts to produce a diffused mirror image of the mask 93 with its cavity 101 as projected onto the base area 99. The reflection formed by the active area of the base becomes the effective aperture of the optical integrating cavity (between the mask and base) when the fixture is considered from the perspective of the area of intended illumination.

With respect to light emissions, the surface area 99 reflects energy emerging from the aperture 103 of the cavity 101 in the mask 93. The mask 93 in turn constructively occludes light diffused from the active base surface 99 with respect to the region illuminated by the system 90. The dimensions and relative positions of the mask and active region on the base control the light distribution performance of the system, in essentially the same manner as in the mask and cavity system of FIGS. 11 and 12.

With respect to incoming light, e.g. of the wavelength detectable by the detector 96, the mask 93 constructively occludes light diffused from the active base surface 99 with respect to the region illuminated by the system 90. The surface area 99 reflects energy entering the system (after occlusion by the mask) toward the aperture 103 of the cavity 101 in the mask 93. The dimensions and relative positions of the mask and active region on the base control the light sensitivity performance of the system, in essentially the same manner as in the mask and cavity system of FIGS. 11 and 12.

The system 90 includes a control circuit 21 and associated power source 23, for supplying controlled electrical power to the LED type solid state sources 95. In this example, the LEDs emit light through openings through the base 91, preferably at points not directly visible from outside the system. LEDs of the same type, emitting the same color of light, could be used. However, in the example, the LEDs 95 supply various wavelengths of light, and the circuit 21 controls the power of each LED, to control the amount of each color of light in the combined output, as discussed above relative to the other examples.

The base 91 could have a flat ring-shaped shoulder with a reflective surface. In this example, however, the shoulder is angled toward the desired field of illumination to form a conical deflector 97. The inner surface of the deflector 97 is reflective, as in the earlier examples.

The deflector 97 has the shape of a truncated cone, in this example, with a circular lateral cross section. The cone has two circular openings. The cone tapers from the large end opening to the narrow end opening, which is coupled to the active area 99 of the base 91. The narrow end of the deflector cone receives light from the surface 99 and thus from diffuse reflections between the base and the mask.

The entire area of the inner surface of the cone 97 is reflective. At least a portion of the reflective surface is specular, as in the deflectors of the earlier examples. The angle of the wall(s) of the conical deflector 97 substantially corresponds to the angle of the desired field of view of the illumination intended for the system 90. Because of the reflectivity of the wall of the cone 97, most if not all of the light reflected by the inner surface thereof would at least achieve an angle that keeps the light within the field of view.

In the illustrated example, the LED light sources 95 emit multiple wavelengths of light into the mask cavity 101. The light sources 95 may direct some light toward the inner surface of the deflector 97. Light rays impacting on the diffusely reflective surfaces, particularly those on the inner surface of the cavity 101 and the facing surface 99 of the base 91, reflect and diffuse one or more times within the confines of the system and emerge through the gap between the perimeter of the active area 99 of the base and the outer edge of the mask 93. The mask cavity 101 and the base surface 99 function as an optical integrating cavity with respect to the light of various wavelengths, and the gap becomes the actual integrating cavity aperture from which substantially uniform combined light emerges. The light emitted through the gap and/or reflected from the surface of the inner surface of the deflector 97 irradiates a region (upward in the illustrated orientation) with a desired intensity distribution and with a desired spectral characteristic, essentially as in the earlier examples.

Figures 15A, 15B:
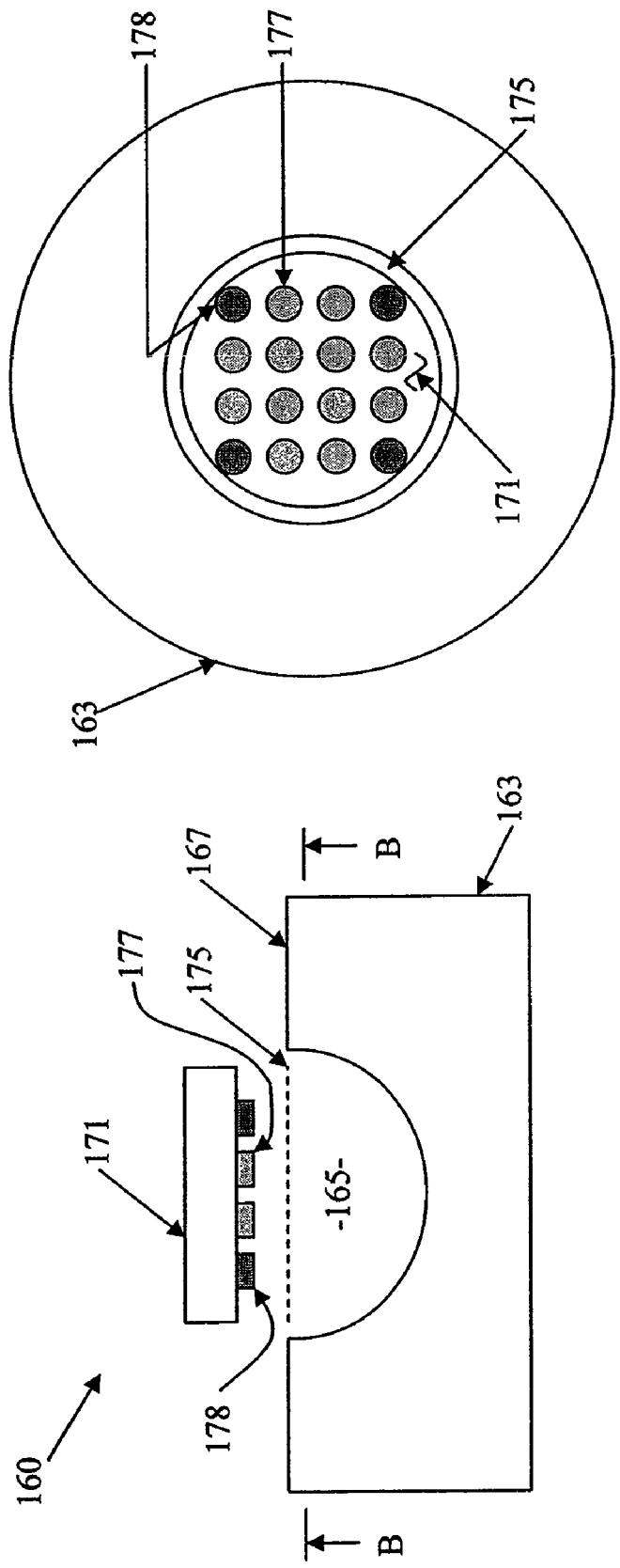
FIG. 15A is a cross-sectional view of another example of a light fixture, utilizing principles of mask-and-cavity constructive occlusion.
FIG. 15B is a cross-section of the fixture of FIG. 15A taken along line B-B.

FIGS. 15A and 15B illustrate yet another mask and cavity type constructive occlusion example. This example is generally similar to that of FIGS. 11 and 12 except that the mask and cavity fixture 160 is circular. Other system elements, such as the power source and control circuit are omitted, as they will generally be the same as in the examples discussed above.

The fixture 160 of the light system includes a base 163, having or forming a cavity 165, and an adjacent shoulder 167, which in this example encircles the aperture 175 of the cavity 165. The base, cavity and shoulder may be constructed in a manner similar to the elements in the earlier examples. The interior of the cavity 165 is diffusely reflective, and the upward-facing surface of the shoulder 167 may be reflective. A mask 171 is disposed between the cavity aperture 175 and the field to be illuminated. Although other shapes may be used, the exemplary cavity 165 consists of a segment of a sphere, for example approximately a hemisphere.

For purposes of constructive occlusion, the base 163 may be considered to have an active optical area, preferably exhibiting a substantially Lambertian energy distribution. Where the cavity is formed in the base, for example, the planar aperture 175 formed by the rim or perimeter of the cavity 165 forms the active surface with substantially Lambertian distribution of energy emerging through the aperture. The mask 171 constructively occludes a portion of the optically active area of the base, that is to say the aperture 175 in this example, with respect to the field of intended illumination. The surface of the mask 171 facing towards the aperture 175 is reflective. Although it may be specular, typically this surface is diffusely reflective.

The mask 171 also serves as a board or support on which are mounted a number of solid state emitters, typically LEDs, 177. The LED type emitters 177 serve as point sources for emission of visible light energy into the cavity 165 for diffuse processing by the mask and cavity system. The mask 171 also serves as a board or support on which are mounted a number of solid state light detectors 178. The solid state light detectors 178 serve as point sensors for sensing one or more wavelengths of electromagnetic energy that are absent from the LED emissions and/or from the combined light generated by processing of the LED emissions by the mask and cavity system.

The relative dimensions of the mask 171 and aperture 175, for example the relative widths (or diameters or radii in a more circular system) as well as the separation distance of the mask 171 away from the aperture 175, control the constructive occlusion performance characteristics of the light fixture 160, both with respect to light emitted from the light fixture 160 and with respect to light received and detected within the fixture 160. Certain combinations of these parameters produce a relatively uniform emission intensity with respect to angles of emission, over a wide portion of the field of emission about the system axis (vertically upward in FIG. 15A), covered principally by the constructive occlusion. Those combinations of fixture parameters similarly produce a relatively uniform sensitivity to incoming light with respect to angles of incidence over a wide portion of the field of view about the system axis (vertically upward in FIG. 15A), covered principally by the constructive occlusion. Other combinations of size and height result in a system performance (emission and detection) that is uniform with respect to a wide planar surface perpendicular to the system axis at a fixed distance from the active area.

Figure 16C:
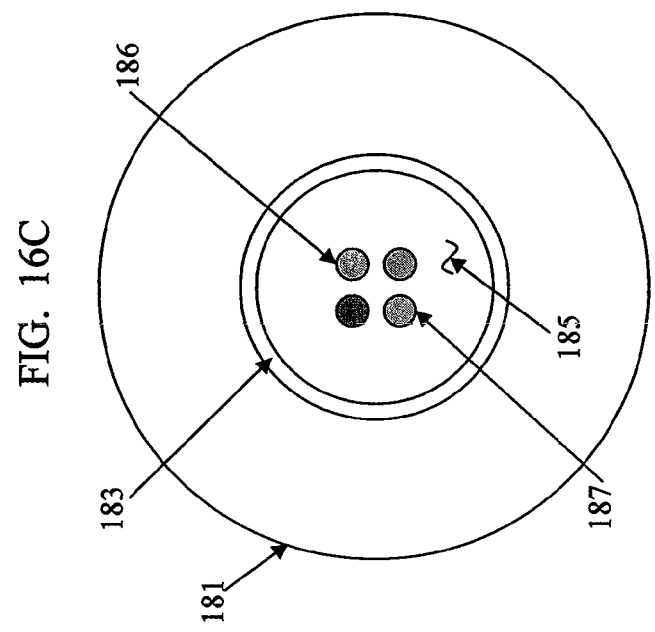
FIG. 16C is a cross-sectional view of the fixture, taken along line C-C of FIG. 16B.
Figure 16D:
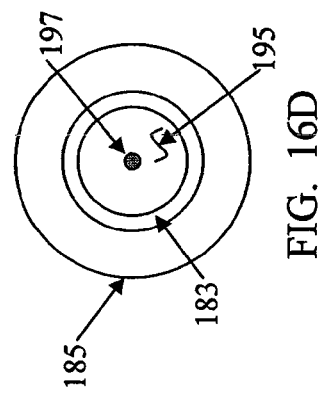
FIG. 16D is a cross-sectional view of the fixture, taken along line D-D of FIG. 16B.
Figure 16A:
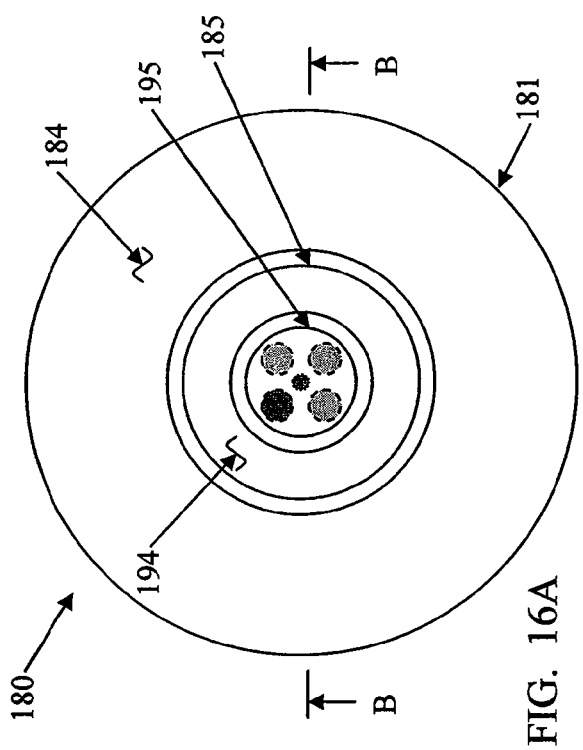
FIG. 16A a top plan view of another example of a fixture, utilizing principles of mask-and-cavity constructive occlusion, having nested optical integrating cavities for emission and detection.
Figure 16B:
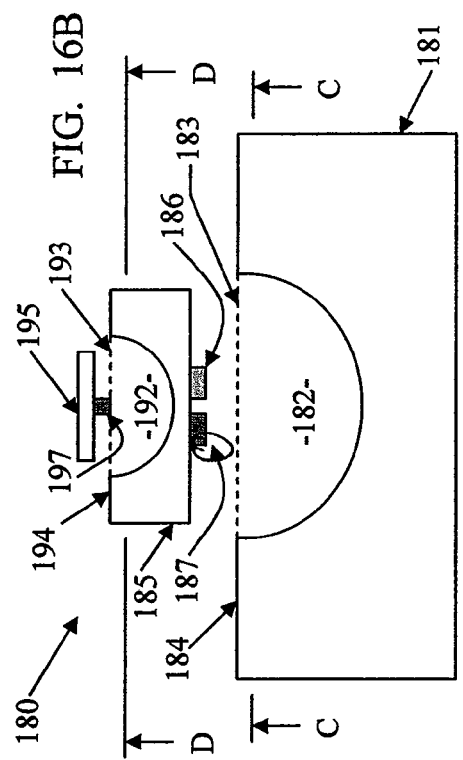
FIG. 16B is a cross-sectional view of the fixture of FIG. 16A, taken along line B-B.

FIGS. 16A to 16D illustrate yet another mask and cavity type constructive occlusion example. This example uses one mask and cavity arrangement for emissions of illuminating light in the visible portion of the spectrum as well as for electromagnetic energy of another wavelength, but it uses a second mask and cavity arrangement for the detection function. The system implements nested constructive occlusion in that the cavity for the detector is actually formed in the mask that occludes the emission aperture. FIG. 16A a top plan view of the light fixture 180, FIG. 16B is a cross-sectional view of the fixture 180 of FIG. 16A taken along line B-B; FIG. 16C is a cross-sectional view of the fixture taken along line C-C of FIG. 16B; and FIG. 16D is a cross-sectional view of the fixture taken along line D-D of FIG. 16B.

1) The fixture 180 of the light system includes a first base 181, having or forming a first cavity 182. The rim of the cavity 182 forms a first aperture 183. The base 181 also has a shoulder 184, which in this example encircles the aperture 183 of the cavity 182. The first base, first cavity and shoulder may be constructed in a manner similar to the elements in the earlier examples. The interior of the cavity 182 is diffusely reflective, and the upward-facing surface of the shoulder 184 may be reflective. Although other shapes may be used, the exemplary cavity 182 consists of a segment of a sphere, for example approximately a hemisphere.

2) A first mask 185 is disposed between the cavity aperture 183 and the field to be illuminated. The aperture 183 forms a substantially Lambertian energy distribution area. The mask 185 constructively occludes a portion of Lambertian virtual source formed at the aperture 183, with respect to the field of intended illumination. The surface of the mask 185 facing towards the aperture 183 is reflective. Although it may be specular, typically this surface is diffusely reflective.

The first mask 185 also serves as a board or support on which are mounted a number of solid state emitters, typically LEDs. In this example, there are two types of LEDs. One or more first LEDs 186 serve as point sources for emission of visible light energy into the cavity 182 for diffuse processing by the first mask and cavity system. The system 180 also includes one or more LEDs 187 for emitting electromagnetic energy of a wavelength that is absent from the light generated by the LEDs 186. Typically, if the LEDs 186 generate visible light, the LED 187 will emit light outside the visible range of the spectrum. Although the LED 187 could emit UV light, for purposes of this discussion, the LED 187 emits IR light. The LEDs 186 and 187 are visible on the cavity facing surface of the first mask 185 in the cross-sectional view of FIG. 16C.

The relative dimensions of the first mask 185 and aperture 183, for example the relative widths (or diameters or radii in a more circular system) as well as the separation distance of the first mask 185 away from the aperture 183, control the constructive occlusion performance characteristics of light emissions from the fixture 180. Certain combinations of these parameters produce a relatively uniform emission intensity with respect to angles of emission, over a wide portion of the field of emission about the system axis (vertically upward in FIG. 15B), covered principally by the constructive occlusion. Other combinations of size and height result in a system emission performance that is uniform with respect to a wide planar surface perpendicular to the system axis at a fixed distance from the aperture.

As outlined above, the first mask 185 constructively occludes the first aperture 183, so as to tailor the distribution performance of the system, that is to say the distribution of light and other electromagnetic energy from the LEDs 186 and 187. However, in this example, the first mask 185 also is the base (second base) with respect to the detector function. For detection purposes, the element 185 has or forms a second cavity 192. The rim of the cavity 192 forms a second aperture 193. The mask/base 185 also has a second shoulder 194, which in this example encircles the aperture 193 of the cavity 192. The mask/base 185, second cavity 192 and shoulder 194 may be constructed in a manner similar to the elements in the earlier examples. The interior of the cavity 192 is diffusely reflective, and the upward-facing surface of the shoulder 194 may be reflective. Although other shapes may be used, the exemplary cavity 192 consists of a segment of a sphere, for example approximately a hemisphere.

A second mask 195 is disposed between the cavity aperture 193 and the field to be illuminated. The aperture 193 forms a substantially Lambertian energy reception area for the detection function. The mask 195 constructively occludes a portion of the aperture 193 with respect to the field of intended illumination and thus with respect to the area from which energy is also to be detected. The surface of the mask 195 facing towards the aperture 193 is reflective. Although it may be specular, typically this surface is diffusely reflective.

The second mask 195 also serves as a board or support on which is mounted at least one solid state detector 197. The solid state light detector 197 serves as a point sensor for sensing one or more wavelengths of electromagnetic energy that is absent from the emissions of LEDs 186 and/or from the combined light generated by processing of those LED emissions by the first mask and cavity system 182 and 185.

Since the LEDs 186 emit visible light, the detector 197 will typically detect electromagnetic energy outside the visible portion of the spectrum, such as UV light. In this example, the detector 197 detects IR light. For some applications, such as two way data communications, the IR detector 197 would detect IR energy of a different wavelength than is emitted by the IR LED 187. However, for an occupancy sensing application or the like, the IR detector 197 might detect IR energy of the same wavelength that is emitted by the IR LED 187, e.g. so that the detector 187 is sensitive to reflections of IR initially generated by the IR LED 187.

The relative dimensions of the second mask 195 and aperture 193, for example the relative widths (or diameters or radii in a more circular system) as well as the separation distance of the mask 195 away from the aperture 193, control the constructive occlusion performance characteristics of light detection by the fixture 180. Certain combinations of these parameters produce a relatively uniform sensitivity with respect to angles of incidence of incoming IR light, over a wide portion of the field of view about the system axis (vertically upward in FIG. 15B), covered principally by the constructive occlusion of the second mask and cavity arrangement. Other combinations of size and height result in a system detection performance that is uniform with respect to a wide planar surface perpendicular to the system axis at a fixed distance from the active area at the aperture 193. The tailored sensitivity of the detection function may be similar to the tailored light distribution, or the two mask and cavity systems may be configured to produce different performance profiles.

Although not shown in these drawings, the detector 197 would provide a detection signal to the system control circuit, as in the earlier examples. The control circuit in turn would process and respond to that signal in one or more of the ways discussed above, for example to control the outputs of the visible light LEDs 186 based on occupancy status as indicated by the reflected IR level indicated by the sensing signal from the detector 197.

In the example of FIGS. 16A to 16D discussed so far, the elements 187 were IR LEDs and the element 197 was an IR detector. Of course these locations/roles may be reversed. The system would work with the element 197 constructed as an IR emitter and one or more elements 187 constructed as an IR detector.

Additional information regarding constructive occlusion based systems for generating and distributing radiant energy and/or for receiving and detecting radiant energy may be found in commonly assigned U.S. Pat. Nos. 6,342,695, 6,334, 700, 6,286,979, 6,266,136 and 6,238,077. The color integration and sensing/control principles discussed herein may be adapted to any of the constructive occlusion devices discussed in those patents.

The exemplary systems discussed herein may have any size desirable for any particular application. A system may be relatively large, for lighting a room or providing spot or flood lighting. The system also may be relatively small, for example, to provide a small pinpoint of light, for an indicator or the like. The system 250*a*, with or even without the lens, is particularly amenable to miniaturization. For example, instead of a plate to support the LEDs, the LEDs could be manufactured on a single chip. If it was not convenient to provide the aperture through the chip, the aperture could be formed through the reflective dome.

As shown by the discussion above, each of the various radiant energy emission systems with solid state light sources and an optical cavity to combine the energy from the sources provides a highly effective means to control the color produced by one or more fixtures. The output characteristics are controlled simply by controlling the amount of light from each of the sources supplying radiant energy to the chamber.

Settings for a desirable color are easily reused or transferred from one system/fixture to another. If color/temperature/balance offered by particular settings are found desirable, e.g. to light a particular product on display or to illuminate a particular person in a studio or theater, it is a simple matter to record those settings and apply them at a later time. Similarly, such settings may be readily applied to another system or fixture, e.g. if the product is displayed at another location or if the person is appearing in a different studio or theater. It may be helpful to consider the product and person lighting examples in somewhat more detail.

For the product, assume that a company will offer a new soft drink in a can having a substantial amount of red product markings. The company can test the product under lighting using one or more fixtures as described herein, to determine the optimum color to achieve a desired brilliant display. In a typical case, the light will generally be white to the observer. In the case of the red product container, the white light will have a relatively high level of red, to make the red markings seem to glow when the product is viewed by the casual observer/customer. When the company determines the appropriate settings for the new product, it can distribute those settings to the stores that will display and sell the product. The stores will use other fixtures of any type disclosed herein. The fixtures in the stores need not be of the exact same type that the company used during product testing. Each store uses the settings received from the company to establish the spectral characteristic(s) of the lighting applied to the product by the store's fixture(s), in our example, so that each product display provides the desired brilliant red illumination of the company's new soft drink product.

Consider now a studio lighting example for an actor or newscaster. The person is tested under lighting using one or more fixtures as described herein, to determine the optimum color to achieve desired appearance in video or film photography of the individual. Again, the light will generally be white to the observer, but each person will appear better at somewhat different temperature or color balance levels. One person might appear more healthy and natural under warmer light, whereas another might appear better under bluer/colder white light. After testing to determine the person's best light color settings, the settings are recorded. Each time the person appears under any lighting using the systems disclosed herein, in the same or a different studio, the technicians operating the lights can use the same settings to control the lighting and light the person with light of exactly the same spectral characteristic(s). Similar processes may be used to define a plurality of desirable lighting conditions for the actor or newscaster, for example, for illumination for different moods or different purposes of the individual's performances.

The methods for defining and transferring set conditions, e.g. for product lighting or personal lighting, can utilize manual recordings of settings and input of the settings to the different lighting systems. However, it is preferred to utilize digital control, in systems such as described above relative to FIG. 3. Once input to a given lighting system, a particular set of parameters for a product or individual become another 'preset' lighting recipe stored in digital memory, which can be quickly and easily recalled and used each time that the particular product or person is to be illuminated.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting system, comprising:
an optical integrating chamber comprising a base, a mask separated from the base, and a cavity formed in at least one of the base and the mask, wherein: opposing surfaces of the base and mask are reflective, at least one of the opposing reflective surfaces exhibits a diffuse reflectivity, and the mask is sized and positioned relative to the base so as to constructively occlude an active area of the base with respect to a region to be illuminated by reflected light emerging from the chamber between the base and mask;
at least one solid state light emitting element for emitting visible light, each solid state light emitting element being coupled to supply visible light to enter the optical integrating chamber in such a manner that substantially all light emitted from each solid state light emitting element reflects diffusely at least once within the interior of the optical integrating chamber before emission from the chamber toward the region;
a detector for detecting electromagnetic energy from the region of a wavelength at least substantially absent from a spectrum of the reflected light; and
a controller for controlling an amount of visible light supplied to the cavity by the at least one solid state light emitting element,
wherein the controller receives a detection signal from the detector.

2. The lighting system of claim 1, wherein:
the cavity is formed in the base; and
an aperture of the cavity forms the active area of the base.

3. The lighting system of claim 2, wherein the detector is coupled to the optical integrating chamber to receive the electromagnetic energy from the region of said wavelength after reflection thereof within the optical integrating chamber.

4. The lighting system of claim 3, further comprising:
a source for illuminating at least a portion of the region with electromagnetic energy of said wavelength without reflection thereof within the optical integrating chamber,
wherein the detector detects electromagnetic energy of said wavelength reflected from within the region.

5. The lighting system of claim 4, further comprising:
another optical integrating chamber having a reflective interior surface, at least a portion of the interior surface of the other optical integrating chamber having a diffuse reflectivity;
wherein the source is coupled to supply electromagnetic energy of said wavelength into the interior surface of the other optical integrating chamber; and
an optical aperture through which electromagnetic energy of said wavelength reflected within the other optical integrating chamber emerges to illuminate at least the portion of the region.

6. The lighting system of claim 5, wherein:
the other optical integrating chamber comprises a portion of the mask serving as another base, another mask separated from the other base, and another cavity formed in at least one of the other base and mask,
opposing surfaces of the other base and mask are reflective,
at least one of the opposing reflective surfaces of the other base and mask exhibits a diffuse reflectivity, and
the other mask is sized and positioned relative to the other base so as to constructively occlude an active area of the other base with respect to at least the portion of the region to be illuminated by electromagnetic energy of said wavelength.

7. The lighting system of claim 6, wherein:
the other cavity is formed in the other base; and
an aperture of the other cavity forms the active area of the other base.

8. The lighting system of claim 1, further comprising:
a source for supplying electromagnetic energy of said wavelength for reflection within the optical integrating chamber and illumination of the region with electromagnetic energy of said wavelength via the optical aperture,
wherein the detector detects electromagnetic energy of said wavelength reflected from within the region.

9. The lighting system of claim 8, further comprising:
another optical integrating chamber having a reflective interior smfac6, at least a portion of the interior surface of the other optical integrating chamber having a diffuse reflectivity; and
an optical aperture of the other optical integrating chamber through which electromagnetic energy of said wavelength reflected from the region enters other optical integrating chamber,
wherein the detector is coupled to receive the reflected electromagnetic energy of said wavelength from the region after diffuse reflection thereof within the other optical integrating chamber.

10. The lighting system of claim 8, wherein:
the other optical integrating chamber comprises a portion of the mask serving as another base, another mask separated from the other base, and another cavity formed in at least one of the other base and mask,
opposing surfaces of the other base and mask are reflective,
at least one of the opposing reflective surfaces of the other base and mask exhibits a diffuse reflectivity, and
the other mask is sized and positioned relative to the other base so as to constructively occlude an active area of the other base with respect to the region.

11. The lighting system of claim 9, wherein:
the other cavity is formed in the other base; and
an aperture of the other cavity forms the active area of the other base.

12. The lighting system of claim 2, further comprising:
a source for illuminating at least a portion of the region with electromagnetic energy of another wavelength at least substantially absent from the spectrum of the reflected light.

* * * * *